(12) United States Patent
Nakahori

(10) Patent No.: US 7,542,316 B2
(45) Date of Patent: Jun. 2, 2009

(54) SWITCHING POWER SUPPLY UNIT

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 268 days.

(21) Appl. No.: 11/512,100

(22) Filed: Aug. 30, 2006

(65) Prior Publication Data

US 2007/0047266 A1    Mar. 1, 2007

(30) Foreign Application Priority Data

Aug. 31, 2005  (JP) ............................. 2005-252918
Aug. 11, 2006  (JP) ............................. 2006-220361

(51) Int. Cl.
*H02M 7/06*   (2006.01)

(52) U.S. Cl. ....................... 363/125; 363/126

(58) Field of Classification Search ............. 363/15, 363/16, 17, 125, 126, 131, 132
See application file for complete search history.

(56) References Cited

U.S. PATENT DOCUMENTS

| | | | | |
|---|---|---|---|---|
| 4,315,306 A | * | 2/1982 | Tol et al. ................... | 363/126 |
| 4,471,423 A | * | 9/1984 | Hase ........................... | 363/90 |
| 4,639,663 A | * | 1/1987 | Ueno et al. ................. | 323/356 |
| 4,903,186 A | * | 2/1990 | Pullen, Jr. .................. | 363/45 |
| 5,241,293 A | * | 8/1993 | Okumura .................... | 336/183 |
| 6,011,704 A | * | 1/2000 | Coleman ..................... | 363/37 |

FOREIGN PATENT DOCUMENTS

| | | |
|---|---|---|
| JP | A 2000-013963 | 1/2000 |
| JP | A 2000-014149 | 1/2000 |
| JP | A 2000-014150 | 1/2000 |
| JP | A 2000-196214 | 7/2000 |
| JP | A-2001-314080 | 11/2001 |
| JP | A-2002-369528 | 12/2002 |
| JP | A 2003-023772 | 1/2003 |
| JP | A 2005-143215 | 6/2005 |

* cited by examiner

*Primary Examiner*—Adolf Berhane
(74) *Attorney, Agent, or Firm*—Oliff & Berridge, PLC

(57) ABSTRACT

A switching power supply unit capable of simplifying its structure by reducing the number of parts for wiring is provided. A rectifier circuit has a diode inserted between a first secondary winding and a second secondary winding to form a series circuit therewith, and a diode inserted between a third secondary winding and a fourth secondary winding to form a series circuit therewith. A smoothing circuit has a first choke coil inserted between an input section connected to a center tap and an output terminal, and a second choke coil inserted between an input part connected to a junction point and an output terminal. A first path and a second path are formed of a wiring member made of a single sheet metal, and a third path and a fourth path are formed of a wiring member made of another sheet metal.

15 Claims, 29 Drawing Sheets

SWITCHING POWER SUPPLY UNIT

BACKGROUND OF THE INVENTION

1. Field of the Invention

The present invention relates to a switching power supply unit in which an input AC voltage obtained by switching operation of an input direct current voltage is transformed by a transformer, then the transformed output AC voltage is rectified and smoothed to be outputted as an output direct current voltage.

2. Description of the Related Art

Hitherto, various types of switching power supply units have been proposed and provided for practical use. As disclosed in Japanese Laid-Open Patent Publication No. 2002-369528 and Japanese Laid-Open Patent Publication No. 2001-314080, one of them is of a type in which an input direct current voltage from a high voltage battery is switched to an input AC voltage by switching operations of a switching circuit connected to an input winding of a transformer, the obtained input AC voltage then being input into an input winding of the transformer to be converted into an output AC voltage, then the converted output AC voltage being taken out from an output winding of the transformer. The voltage appearing in the output winding in association with such switching operation of the switching circuit is then rectified by a rectifier circuit, the rectified voltage then being converted into an output direct current voltage by a smoothing circuit to be output.

SUMMARY OF THE INVENTION

In a switching power supply unit of this kind, a rectifier circuit is configured of two rectifier devices arranged between a secondary winding of the transformer and wiring of the smoothing circuit, for example, so as to separately rectify each of the half wave periods of the output AC voltages supplied from the transformer. That is, the secondary winding of the transformer and the wiring of the smoothing circuit are formed of a separate wiring, respectively, and large number of parts is needed for wiring. Thereby, there is such a problem that the structure is intricate.

In addition, this kind of switching power supply unit has another problem of being easily influenced by the noise from the outside because of a long wiring of the secondary side of the transformer, or of being hardly accommodated compactly within an electronic equipment if the rectifier circuit and the smoothing circuit connected to the secondary side of the transformer are arranged vaguely without any particular vision.

In view of the drawbacks of the invention, it is desirable to provide a switching power supply unit capable of simplifying its configuration by reducing the number of parts of wiring. Further, it is desirable to provide a switching power supply unit that is hardly influenced by the noise from outside. Furthermore, it is desirable to provide a switching power supply unit capable of being accommodated compactly within electronic equipment.

According to a first embodiment of the present invention, there is provided a switching power supply unit including a switching circuit, a transformer, a rectifier circuit, and a smoothing circuit. The switching circuit is an inverter circuit which converts a DC input voltage into an AC voltage. The transformer has a primary winding connected to the switching circuit, and a first secondary winding, a second secondary winding, a third secondary winding and a fourth secondary winding. The rectifier circuit has a first rectifier device and a second rectifier device. The first rectifier device is inserted between the first secondary winding and the second secondary winding to form a series circuit therewith, and the second rectifier device is inserted between the third secondary winding and the fourth secondary winding to form a series circuit therewith. The smoothing circuit has a first input end, a second input end, a first output end, and a second output end. The first input end is connected to a junction between the second secondary winding and the third secondary winding. The second input end is commonly connected to a first end portion which is an end portion of the fourth secondary winding on a side opposite to the second rectifier device, and to a second end portion which is an end portion of the first secondary winding on a side opposite to the first rectifier device. The first output end and the second output end are provided corresponding to the first input end and the second input end, respectively.

In the first embodiment, a direct current voltage inputted into the switching circuit is converted into an AC voltage in the switching circuit, then the converted AC voltage is transformed by the transformer and is outputted to the rectifier circuit. Here, since the rectifier circuit is equivalent to a rectifier circuit which is configured by connecting a first rectifier device between a second secondary winding and a junction and by connecting a second rectifier device between a third secondary winding and the junction, the AC voltage transformed by the transformer is rectified in the same operation as the equivalent circuit, and then smoothed in the smoothing circuit to be outputted from the first output end and the second output end.

Here, in the above-mentioned equivalent circuit, the secondary winding of the transformer and wiring of the smoothing circuit are connected via the rectifier device. That is, the secondary winding of the transformer and wiring of the smoothing circuit are formed of a separate wiring, respectively. On the other hand, in the first embodiment, the secondary winding of the transformer and wiring of the smoothing circuit are connected in such a way that they are not divided by the rectifier device while maintaining the rectification function held by the above-mentioned equivalent circuit. With such a configuration, it is possible to form the secondary winding of the transformer and wiring of the smoothing circuit with a common wiring.

For example, a first wiring member in a shape of plate constitutes a first path and a second path. Here, the first path is a path from an end portion of the second secondary winding on a side of the first rectifier device to the first output end via the junction between the second secondary winding and the third secondary winding and via the first input end, and a second path is a path from an end portion of the third secondary winding on a side of the second rectifier device to the first output end via the junction between the second secondary winding and the third secondary winding and via the first input end. On the other hand, a second wiring member in a shape of plate constitutes a third path and a fourth path. Here, the third path is a path from an end portion of the first secondary winding on a side of the first rectifier device to the second output end via the second end portion and via the second input end, while the fourth path is a path from an end portion of the fourth secondary winding on a side of the second rectifier device to the second output end via the first end portion and via the second input end to the second output end.

According to a second embodiment of the present invention, there is provided a switching power supply unit including a switching circuit, a transformer, a rectifier circuit, and a smoothing circuit. The switching circuit is an inverter circuit which converts a DC input voltage into an AC voltage. The transformer has a primary winding connected to the switching circuit, and a first secondary winding and a second secondary winding. The rectifier circuit has a first rectifier device and a second rectifier device. The first rectifier device is inserted between the first secondary winding and the second secondary winding, and one end of the second rectifier device is connected to a first end portion which is an end portion of the second secondary winding on a side opposite to the first rectifier, while the other end of the second rectifier device is connected to a second end portion which is an end portion of the first secondary winding on a side opposite to the first rectifier. The smoothing circuit has a first input end, a second input end, a first output end, and a second output end. The first input end is connected to a junction between the first secondary winding and the first rectifier device. The second input end is commonly connected to the first end portion and one end of the second rectifier device. The first output end and the second output end are provided corresponding to the first input end and the second input end, respectively.

In the second embodiment, a direct current voltage inputted into the switching circuit is converted into an AC voltage in the switching circuit, then the converted AC voltage is transformed by the transformer and is outputted to the rectifier circuit. Here, since the rectifier circuit is equivalent to a rectifier circuit that is configured by connecting a second rectifier device between a first secondary winding and a junction, the AC voltage transformed by the transformer is rectified in the same operation as the equivalent circuit, and then smoothed in the smoothing circuit to be outputted from the first output end and the second output end.

Here, in the above-mentioned equivalent circuit, the secondary winding of the transformer and wiring of the smoothing circuit are connected via the rectifier device. That is, the secondary winding of the transformer and wiring of the smoothing circuit are formed of a separate wiring, respectively. On the other hand, in the second embodiment, the secondary winding of the transformer and wiring of the smoothing circuit are connected in such a way that they are not divided by the rectifier device while maintaining the rectification function held by the above-mentioned equivalent circuit. With such a configuration, it is possible to form the secondary winding of the transformer and wiring of the smoothing circuit with a common wiring.

For example, a path from the second end portion via the junction and the first input end to the first output end may be formed of a first wiring member in a shape of plate, while the second secondary winding maybe formed of a second wiring member in a shape of plate.

According to a third embodiment of the present invention, there is provided a switching power supply unit including a switching circuit, a transformer, a rectifier circuit, and a smoothing circuit. The switching circuit is an inverter circuit which converts a DC input voltage into an AC voltage. The transformer has a primary winding connected to the switching circuit, and a first secondary winding and a second secondary winding connected to each other. The rectifier circuit has a first rectifier device and a second rectifier device. The first rectifier device is inserted between the ground and a first end portion which is an end portion of the second secondary winding on a side opposite to the first secondary winding, and the second rectifier device is inserted between the ground and a second end portion which is an end portion of the first secondary winding on a side opposite to the second secondary winding. The smoothing circuit has a first input end, a second input end, a first output end, and a second output end. The first input end is connected to a junction between the first secondary winding and the second secondary winding. The second input end is commonly connected to the first rectifier device, the second rectifier device and the ground. The first output end and the second output end are provided corresponding to the first input end and the second input end, respectively.

In the third embodiment, a direct current voltage inputted into the switching circuit is converted into an AC voltage in the switching circuit, then the converted AC voltage is transformed by the transformer and is outputted to the rectifier circuit. Here, since the rectifier circuit is equivalent to a rectifier circuit that is configured by connecting a first rectifier device between a second secondary winding and a junction, and by connecting a second rectifier device between a first secondary winding and a junction, the AC voltage transformed by the transformer is rectified in the same operation as the equivalent circuit, and then smoothed in the smoothing circuit to be outputted from the first output end and the second output end.

Here, in the above-mentioned equivalent circuit, the secondary winding of the transformer and wiring of the smoothing circuit are connected via the rectifier device. That is, the secondary winding of the transformer and wiring of the smoothing circuit are formed of a separate wiring, respectively. On the other hand, in the third embodiment, the secondary winding of the transformer and wiring of the smoothing circuit are connected in such a way that they are not divided by the rectifier device while maintaining the rectification function held by the above-mentioned equivalent circuit. With such a configuration, it is possible to form the secondary winding of the transformer and wiring of the smoothing circuit with a common wiring.

For example, a first wiring member in a shape of plate constitutes a path from the secondary end portion to the first output end via the junction between the first secondary winding and the second secondary winding and via the first input end, and a second wiring member in a shape of plate constitutes a second secondary winding. Or, the first wiring member in a shape of plate constitutes a path from the first end portion to the first output end via the junction between the first secondary winding and the second secondary winding and via the first input end, and the second wiring member in a shape of plate constitutes the first secondary winding.

According to a fourth embodiment of the present invention, there is provided a switching power supply unit including, on a substrate,: a transformer transforming and outputting an AC voltage; a rectifier circuit rectifying the AC voltage supplied from the transformer; and a smoothing circuit smoothing and outputting the voltage rectified by the rectifier circuit. The transformer is disposed adjacent to both of the rectifier circuit and the smoothing circuit. The rectifier circuit is mounted on the substrate with an intermediate base in between in a manner of bare chip mounting.

In the fourth embodiment, since the transformer is disposed adjacent to both of the rectifier circuit and the smoothing circuit and the rectifier circuit is mounted on the substrate with an intermediate base in between in a manner of bare chip mounting, it is possible to shorten wiring connected to the secondary side of the transformer.

Here, in a case where the switching power supply unit is provided with a switching circuit which converts a DC input voltage into an AC voltage to output the converted AC voltage to the transformer, it is possible to mount the switching circuit on the substrate with an intermediate base in between in a manner of bare chip mounting. Further, it is also possible to mount the switching circuit and the rectifier circuit integrally on the substrate using with an intermediate base in between in a manner of bare chip mounting.

According to a fifth embodiment of the present invention, there is provided a switching power supply unit including, on a substrate,: a transformer transforming and outputting an AC voltage; a rectifier circuit rectifying the AC voltage supplied from the transformer; and a smoothing circuit smoothing and outputting the voltage rectified by the rectifier circuit. The rectifier circuit, the transformer, and the smoothing circuit are arranged in a line in this order.

In the fifth embodiment, since the rectifier circuit, the transformer, and the smoothing circuit are arranged in a line in this order, the overall configuration becomes elongated.

According to the first, second and third embodiment, since the secondary winding of the transformer and wiring of the smoothing circuit are formed of a common wiring, it is possible to reduce the number of parts thereof, and the structure can be simplified.

According to the fourth embodiment, the transformer is disposed adjacent to both of the rectifier circuit and the smoothing circuit and the rectifier circuit is mounted on the substrate with an intermediate base in between in a manner of bare chip mounting. Thereby, it is possible to shorten wiring connected to the secondary side of the transformer. Thereby, wiring resistance and an inductance component can be reduced while influence of noise from the outside can become less. As a result, ringing, surge, and power loss can be reduced.

According to the fifth embodiment, since the rectifier circuit, the transformer, and the smoothing circuit are arranged in a line in this order, the overall configuration can be made elongated. Thereby, even in a case where a free space in the electronic equipment is limited, it is possible to accommodate the switching power supply unit compactly in electronic equipment.

Other and further objects, features and advantages of the invention will appear more fully from the following description.

DETAILED DESCRIPTION OF THE PREFERRED EMBODIMENTS

The present invention will be more fully understood from the following description of preferred embodiments when reference is made to the accompanying drawings.

First Embodiment

Figure 1:
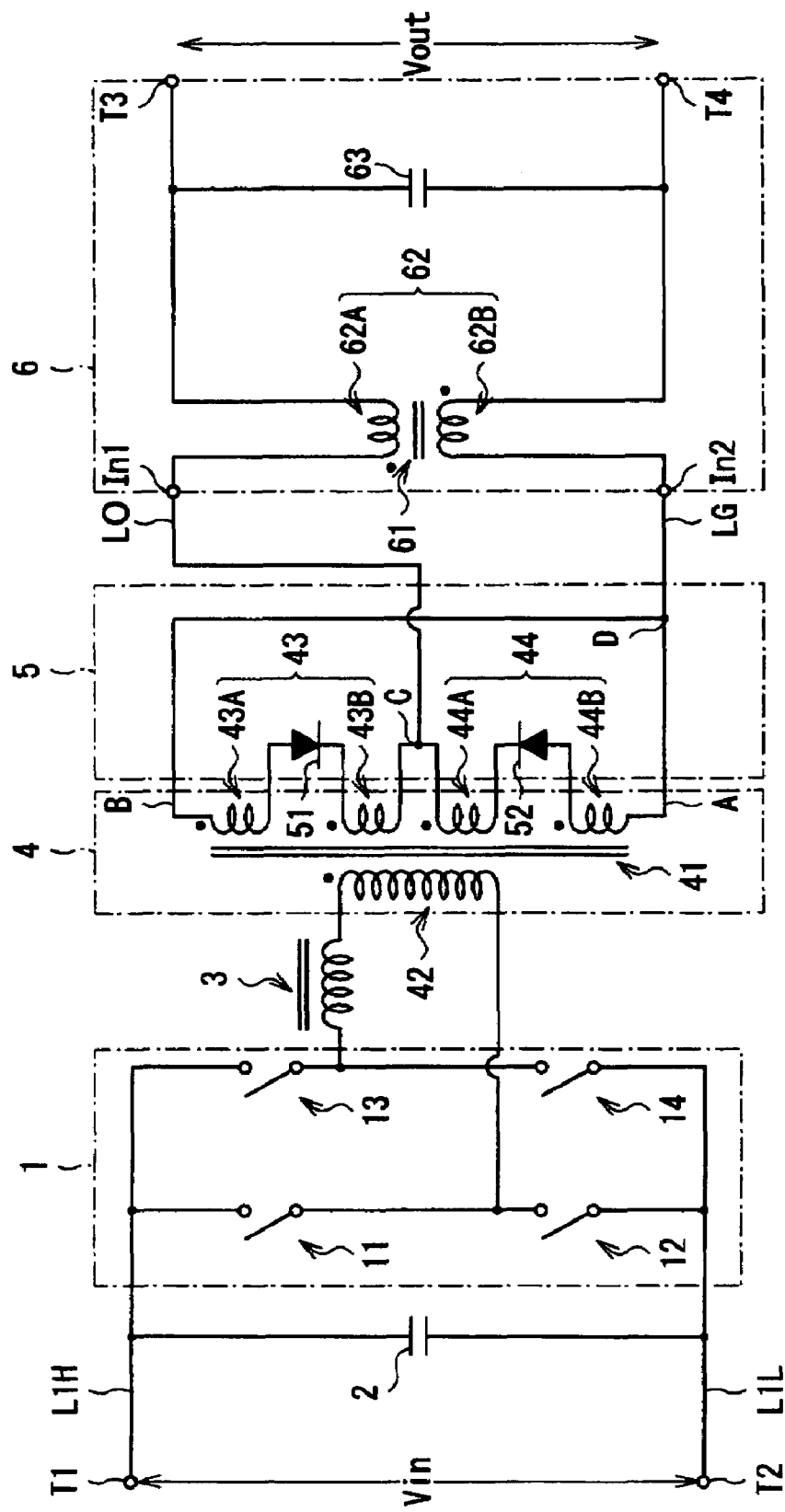
FIG. 1 is a circuit diagram of a switching power supply unit according to a first embodiment of the present invention.
Figure 2:
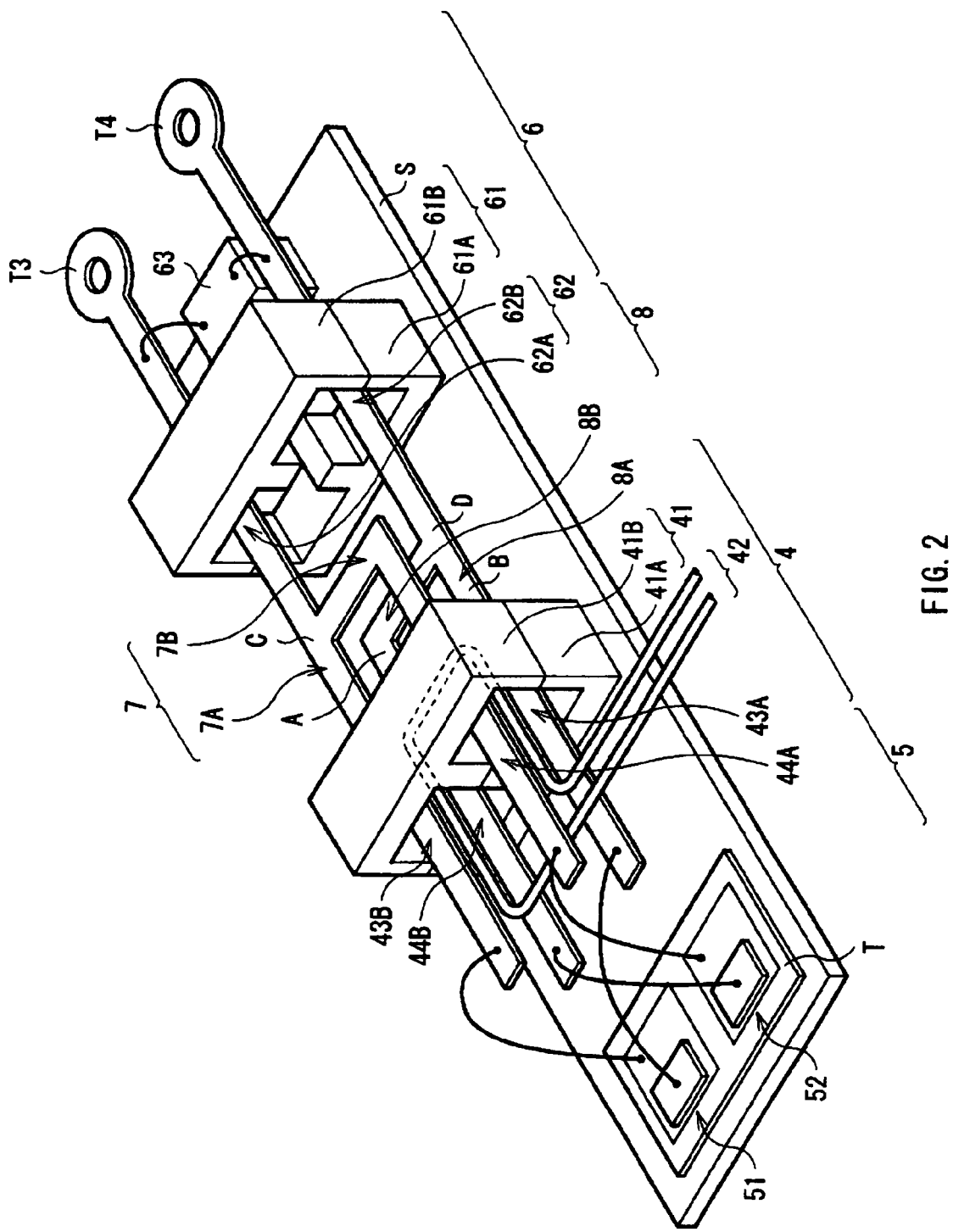
FIG. 2 shows a configuration of the switching power supply unit shown in FIG. 1.

FIG. 1 is a circuit diagram of a switching power supply unit according to a first embodiment of the present invention, and FIG. 2 shows a configuration of the switching power supply unit of FIG. 1. The switching power supply unit functions as a DC-DC converter for converting a high DC input voltage Vin supplied from a high-voltage battery (not shown) to a lower DC output voltage Vout, and the converted DC output voltage Vout is supplied to a load (not shown). As mentioned later, the secondary side of the switching power supply unit is of a center tap type.

The switching power supply unit includes: an inverter circuit 1 (a switching circuit) and a smoothing capacitor 2 provided between a primary-side high voltage line L1H and a primary-side low voltage line L1L; a three winding transformer 4 including a primary winding 42 and secondary windings 43 and 44; and an inductor 3 for resonance provided between the inverter circuit 1 and the transformer 4. An input terminal T1 is provided on the primary-side high voltage line L1H and an input terminal T2 is provided on the primary-side low voltage line L1L, respectively, and the input terminals T1 and T2 are connected to the output terminal of the high voltage battery.

The switching power supply unit further includes a rectifier circuit 5 and a smoothing circuit 6 located on the secondary side of the transformer 4. An output terminal T3 (a first output end) is provided in an output line LO, which is a line on the high voltage side of the smoothing circuit 6, and an output terminal T4 (a second output end) is provided in a ground line LG, which is a line on the low voltage side of the smoothing circuit 6, respectively. And the output terminals T3 and T4 are connected to the input terminal of the load.

The inverter circuit 1 is a single phase inverter circuit which converts a DC input voltage Vin outputted from the high voltage battery into a single phase AC voltage of rectangular wave. The inverter circuit 1 is a switching circuit of a full bridge type configured by making a full bridge connection of four switching elements 11, 12, 13, and 14 which are driven with switching signals transmitted from a control circuit (not shown) respectively. Examples of the switching elements to be used are MOS-FETs (Metal Oxide Semiconductor-Field Effect Transistors), IGBTs (Insulated Gate Bipolar Transistors), or the like.

The switching element 11 is disposed between one end of the primary winding 42 of the transformer 4 and the primary-side high voltage line L1H, and the switching element 12 is disposed between one end of the primary winding 42 and the primary-side low voltage line L1L. The switching element 13 is disposed between one end of the inductor 3 for resonance which is connected to the other end of the primary winding 42 and the primary-side high voltage line L1H, and the switching element 14 is disposed between one end of the inductor 3 for resonance and the primary-side low voltage line L1L.

With the foregoing configuration, current in the inverter circuit 1, current flows into a first current path, which is from the primary-side high voltage line L1H through the switching element 11, the primary winding 42, the inductor 3 for resonance, the switching element 14 and then to the primary-side low voltage line L1L in this order, when the switching elements 11 and 14 are turned ON. On the other hand, current flows into a second current path, which is from the primary-side high voltage line L1H through the switching element 13, the inductor 3 for resonance, the primary winding 42, the switching element 12 and then to the primary-side low voltage line L1L in this order, when the switching elements 12 and 13 are turned ON.

The inductor 3 for resonance forms a resonance circuit with at least one of parasitic capacitances of the switching elements 11, 12, 13, and 14 so as to be able to reduce the power loss due to ON/OFF operation of the switching elements by use of the resonance characteristics. The inductor 3 for resonance may be configured by arranging an actual coil component. Or, in substitution for that (or in addition to that), the inductor 3 may be configured using a series inductance including a leakage inductance (not shown), a wiring, etc. of the transformer 4.

The transformer 4 is a magnetic device in which a primary winding 42 and secondary windings 43 and 44 mutually connected in series are magnetically coupled each other by winding around a magnetic core 41 in such a way that all the windings have a polarity of the same direction each other. The transformer 4 is a step-down transformer, in which each of the number of turns of the secondary winding 43 and the secondary winding 44 are set to be less than that of the primary winding 42. The degree of voltage drop is determined by the turn ratio between the primary winding 42 and the secondary windings 43 and 44.

The magnetic core 41 has a magnetic path of a figure of "8", and is configured of, for example, a magnetic core 41A and a magnetic core 41B, each of which has a figure of "E", in which the magnetic core 41A is mounted on a substrate S with conductive patterns (not shown) while the magnetic core 41B is mounted on the magnetic core 41A.

The primary winding 42 is disposed on the primary side of the transformer 4 and is connected to the inverter circuit 1 so that the direction of current flowing into the primary winding 42 itself changes in accordance with the operation of the inverter circuit 1. Specifically, one end of the primary winding 42 is connected to the junction between the switching element 13 and the switching element 14 via the inductor 3 for resonance. The other end of the primary winding 42 is connected to the junction point of the switching element 11 and the switching element 12.

The secondary winding 43 is configured of a first secondary winding 43A and a second secondary winding 43B respectively connected to the ends of a below-mentioned diode 51 in series. The secondary winding 43 is formed in such a way that the first secondary winding 43A is wound around the magnetic core 41 by half a turn while the second secondary winding 43B is wound around the magnetic core 41 by half a turn so that they can be cooperatively wound around the magnetic core 41 just by one turn as a whole.

The secondary winding 44 is configured of a third secondary winding 44A and a fourth secondary winding 44B respectively connected to the ends of a below-mentioned diode 52 in series. The secondary winding 44 is formed in such a way that the third secondary winding 44A is wound around the magnetic core 41 by half a turn while the fourth secondary winding 44B is wound around the magnetic core 41 by half a turn so that they can be cooperatively wound around the magnetic core 41 just by one turn as a whole.

An end portion of the second secondary winding 43B on a side opposite to the diode 51, and an end portion of the third secondary winding 44A on a side opposite to the diode 52, are mutually connected at a center tap C (a junction), and the center tap C is connected to an input end In1 (a first input end) via the output line LO. On the other hand, an end portion A (a first end portion) of the fourth secondary winding 44B on a side opposite to the diode 52, and an end portion B (a second end portion) of the first secondary winding 43A on a side opposite to the diode 51, are mutually connected at a junction point D, and the junction point D is connected to an input end In2 (a second input end) via the ground line LG. That is, the secondary side of the transformer 4 is of a center tap connection type.

The substrate S is made of an aluminum die-casting, for example, and may be electrically connected to the ground or may be electrically isolated from the ground.

The rectifier circuit 5 is a single-phase full-wave rectifier including a pair of rectifier diodes 51 (a first rectifier device) and 52 (a second rectifier device). The anode of the rectifier diode 51 is connected to one end of the first secondary winding 43A of the transformer 4, and the cathode of the rectifier diode 51 is connected to one end of the second secondary winding 43B of the transformer 4. The anode of the rectifier diode 52 is connected to one end of the fourth secondary winding 44B of the transformer 4, and the cathode of the rectifier diode 52 is connected to one end of the third secondary winding 43A of the transformer 4.

Figure 3:
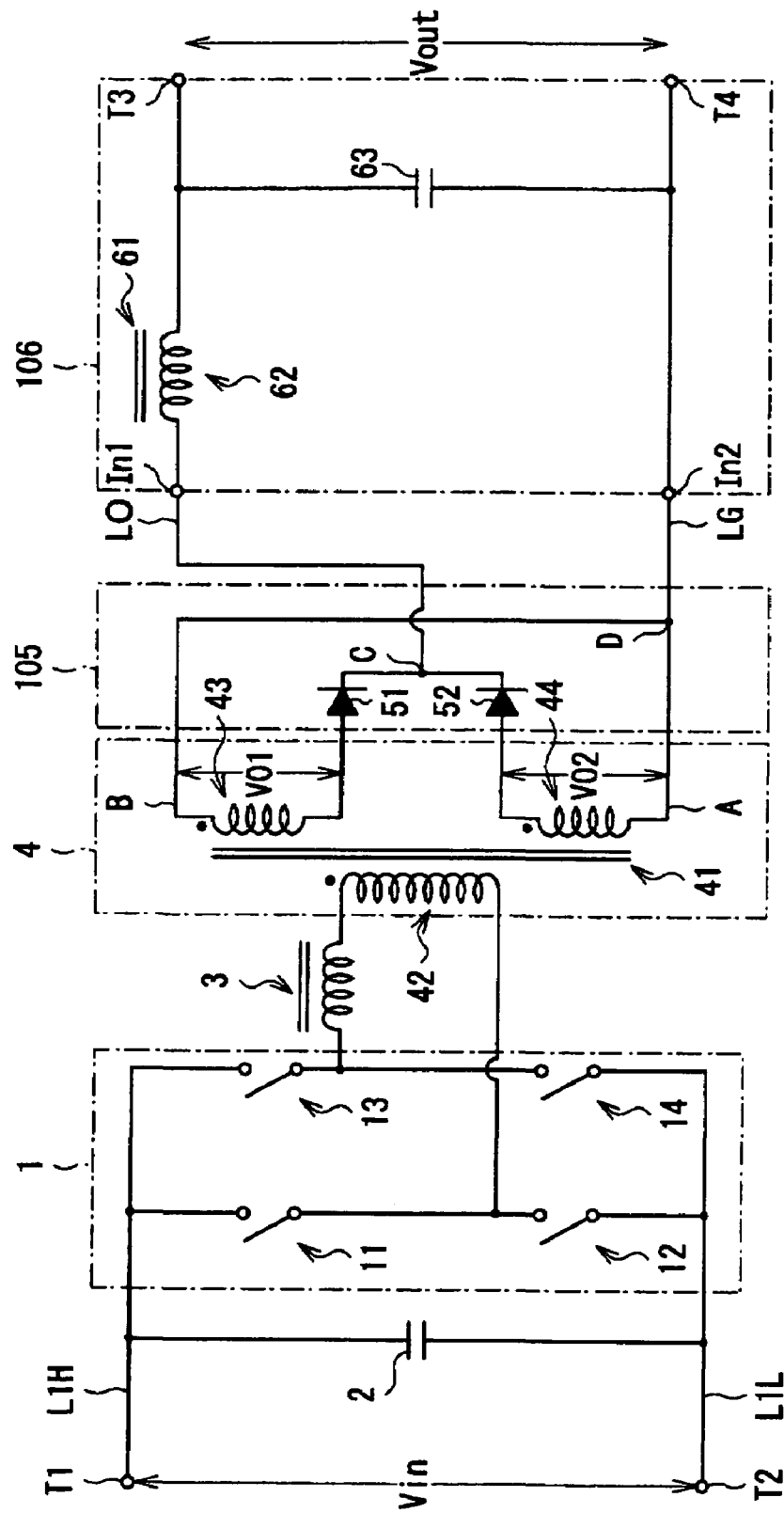
FIG. 3 is a circuit diagram of a switching power supply unit according to a comparative example.

The rectifier circuit 5 is equivalent to a rectifier circuit 105 of cathode common connection type which is configured by inserting a diode 51 between a secondary winding 43 and a center tap C, and inserting a diode 52 between a secondary winding 44 and the center tap C, as shown in FIG. 3. Therefore, similarly to the rectifier circuit 105 shown in FIG. 3, the circuit including the rectifier circuit 5 rectifies the separate half wave periods of the AC output voltages VO1 and VO2 of the transformer 4 by the diodes 51 and 52 respectively to output the rectified voltages from the center tap C and the junction point D.

The smoothing circuit 6 includes a magnetic core 61, a choke coil 62 and a smoothing capacitor 63, and smoothes the rectified voltage inputted into the first input end In1 and the second input end In2 to generate a DC output voltage Vout. Then, the DC output voltage Vout is supplied from the output terminals T3 and T4 to a load L.

The magnetic core 61 has a magnetic path formed into a figure of "8" whose center leg is provided with a gap at the midpoint thereof. For example, the magnetic core 61 includes a magnetic core 61A and a magnetic core 61B, each of which is formed into a figure of "E" and is configured by mounting the magnetic core 61A on the substrate S and then mounting the magnetic core 61B on the magnetic core 61A.

The choke coil 62 includes a first choke coil 62A and a second choke coil 62B. The choke coil 62A is formed in such a way that the wiring provided between the first input end In1 and the output terminal T3 is wound around the magnetic core 61 by half a turn, while the choke coil 62B is formed in such a way that the wiring provided between the second input end In2 and the output terminal T4 is wound around the magnetic core 61 by half a turn, so that the choke coil 62 is wound around the magnetic core 61 just by one turn as a whole.

The smoothing circuit 6 is equivalent to a smoothing circuit 106 which is configured by connecting a choke coil 62 to an output terminal T3 in series, as shown in FIG. 3. Like in the case of the smoothing circuit 106, the rectified voltage outputted from the rectifier circuit 5 is smoothed to produce a DC output voltage Vout, then the DC output voltage Vout is outputted to the output terminals T3 and T4.

Next, the operation of the switching power supply unit having the foregoing configuration will be described. Although a case where the inverter circuit 1 is driven by a general switching operation is explained below, it is also possible to drive the inverter circuit 1 by zero volt switching operation for example.

If the switching elements 11 and 14 of the inverter circuit 1 are turned ON, current flows in the direction from the switching element 11 to the switching element 14, thereby a voltage appearing across the secondary windings 43 and 44 of the transformer 4 is applied in the opposite direction with respect to the diode 52, and in the forward direction with respect to the diode 51. For this reason, current flows into the output line LO through the secondary winding 43 and the diode 51.

If the switching elements 11 and 14 are turned OFF from ON, the voltage appearing across the secondary winding 44 of the transformer 4 is applied in the forward direction with respect to the diode 52. For this reason, current flows into the output line LO through the secondary winding 44 and the diode 52.

Next, if the switching elements 12 and 13 are turned ON, current flows in the direction from the switching element 13 to the switching element 12, thereby the voltage appearing across the secondary windings 43 and 44 of the transformer 4 is applied in the forward direction with respect to the diode 52 while applied in the opposite direction with respect to the diode 51. For this reason, current flows into the output line LO through the secondary winding 44 and the diode 52.

Finally, if the switching elements 12 and 13 are turned OFF from ON, the voltage appearing across the secondary winding 43 of the transformer 4 is applied in the forward direction with respect to the diode 51. For this reason, current flows into the output line LO through the secondary winding 43 and the diode 51.

In this manner, the switching power supply unit transforms (step down) a DC input voltage Vin supplied from a high voltage battery to a DC output voltage Vout to supply the transformed DC output voltage Vout to a low voltage battery.

Next, effects of the switching power supply unit of the present embodiment will be explained as compared with a comparative example.

Figure 4:
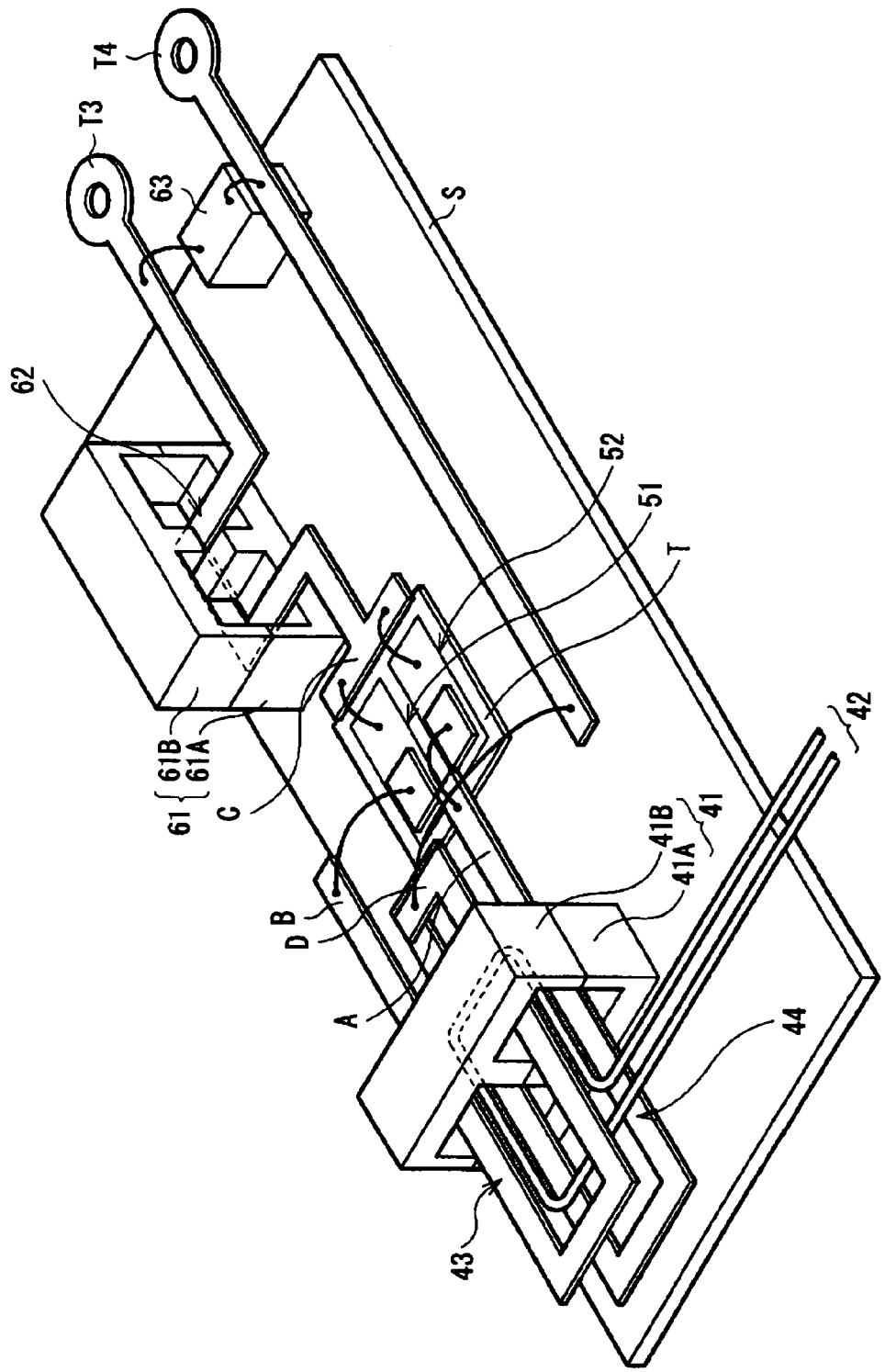
FIG. 4 shows a configuration of the switching power supply unit shown in FIG. 3.

In the comparative example, as shown in FIG. 4, the secondary windings (the secondary windings 43 and 44) of the transformer 4 and wiring of the smoothing circuit 106 are divided by the diodes 51 and 52 of the rectifier circuit 105. That is, the secondary winding of the transformer 4 and the wiring of the smoothing circuit 106 are formed of a separate wiring, respectively, thereby large number of parts is needed for wiring and the structure is intricate. In order to electrically connect such wiring as divided in this way, mutual electrical connection by means of screw fastening, solder or welding, etc. is needed between the wirings extended from each of the diodes 51 and 52, the secondary windings 43 and 44, the choke coil 62 and the output terminals T3 and T4, and the smoothing capacitor 63.

On the other hand, in the present embodiment, as shown in FIG. 2, a first path 7A from an end portion of the second secondary winding 43B on a side connected to the diode 51 to the output terminal T3 via the center tap C, and a second path 7B from an end portion of the third secondary winding 44A on a side connected to the diode 52 to the output terminal T3 via the center tap C, are integrally formed of a wiring member 7 (a first wiring member) made of a single sheet metal. Moreover, a third path 8A from an end portion of the first secondary winding 43A on a side connected to the diode 51 to the output terminal T4 via the end portion B, and a fourth path 8B from an end portion of the fourth winding 44B on a side connected to the diode 52 to the output terminal T4 via the end portion A, are integrally formed of a wiring member 8 (a second wiring member) made of a single sheet metal. That is, the secondary windings (the secondary windings 43 and 44) of the transformer 4 and the wiring of the smoothing circuit 6 are formed of the two sheet metals (the wiring members 7 and 8). At this time, the diodes 51 and 52 of the rectifier circuit 5 are disposed in the vicinity of the end portions of these wiring members 7 and 8.

As described above, according to the present embodiment, since the secondary windings (the secondary windings 43 and 44) of the transformer 4 and the wiring of the smoothing circuit 6 are formed of two sheet metals (wiring members 7 and 8), the number of parts for wiring can be reduced from four parts to two parts compared with the configuration of the comparative example, and the structure can be simplified.

In this manner, according to the present embodiment, what is necessary is just to electrically connect the diodes 51 and 52, the wiring members 7 and 8, and the smoothing capacitor 63 each other by means of screw fastening, solder or welding, etc. Thereby man-hour requirement for the connecting operation can be reduced. In addition, since the number of junction points of wiring is decreased, generation of heat and power loss caused by the contact resistance in the junction point of wiring can be reduced. Moreover, since occurrence possibility of loosened screw or solder crack is reduced, reliability can be raised.

In addition, according to the present embodiment, the rectifier circuit 5, the transformer 4, and the smoothing circuit 6 are arranged in a line in this order while the transformer 4 and the smoothing circuit 6 are disposed adjacent to each other. Further, the rectifier circuit 5 is mounted on the substrate S with an intermediate base in between in a manner of bare chip mounting. Thereby, since wiring connected to the secondary side of the transformer 4 can be shortened compared with the configuration of the comparative example, wiring resistance and an inductance component can be reduced while influence of the noise from the outside can be reduced. As a result, ringing, surge, and power loss can be reduced.

It is to be noted that the intermediate base T is made of an insulating material, such as a ceramic, a plastic, or a film. Or, an insulating layer may be provided on the surface of the substrate S instead of the intermediate base T so that bare chip mounting can be carried out via the insulating layer. In this manner of mounting the rectifier 5 on the substrate S with an intermediate base in between in a manner of bare chip mounting, heat generated in the rectifier circuit 5 can be efficiently transmitted to the substrate S so that heat dissipation characteristics can be improved. In particular, in a case where the intermediate base T is formed of an insulating film or an insulating layer is provided on the surface of the substrate S instead of the intermediate base T, thermal conductivity to the substrate S is high, and heat dissipation characteristics can be more improved.

According to the present embodiment, although the rectifier circuit 5, the transformer 4, and the smoothing circuit 6 are disposed in this order in a line, they may be disposed in such a way that the arrangement direction of the transformer 4 and the rectifier circuit 5 and the arrangement direction of the transformer 4 and smoothing circuit 6 may cross at right angles, for example. Even in such configuration, the transformer 4 and the smoothing circuit 6 can be disposed adjacent to each other. Therefore, it becomes possible to shorten the wiring connected to the secondary side of the transformer 4. Thereby, wiring resistance and an inductance component can be reduced while influence of the noise from the outside can be reduced. As a result, ringing, surge, and power loss can be reduced.

In addition, in the present embodiment, since the rectifier circuit 5, the transformer 4, and the smoothing circuit 6 are arranged in a line in this order, the overall configuration of the switching power supply unit can be made elongated. Thereby, even in a case where a free space in the electronic equipment is limited, it becomes possible to accommodate the switching power supply unit compactly in electronic equipment.

Modification of First Embodiment

Figure 5:
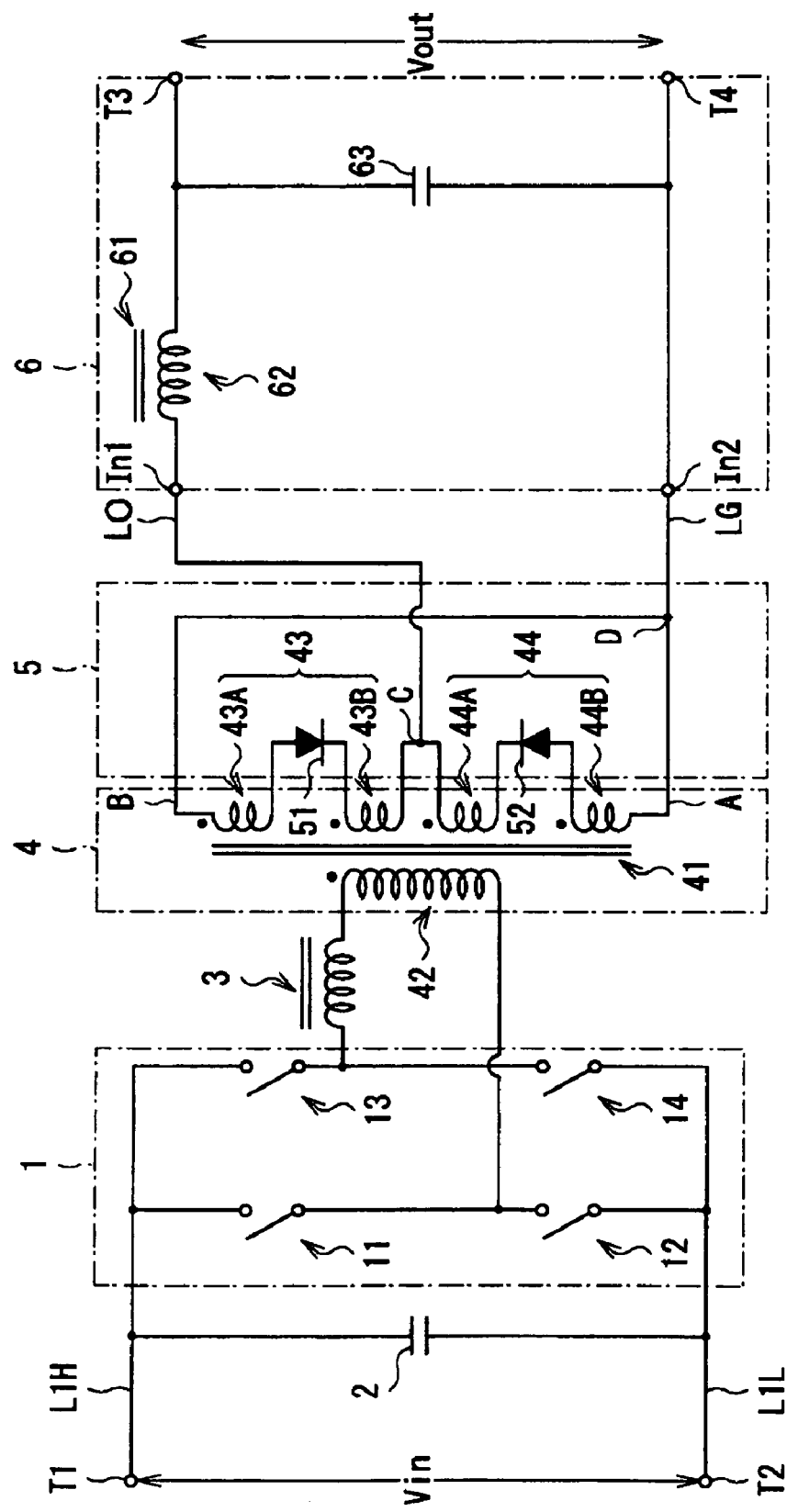
FIG. 5 is a circuit diagram of a switching power supply unit according to a modification.
Figure 6:
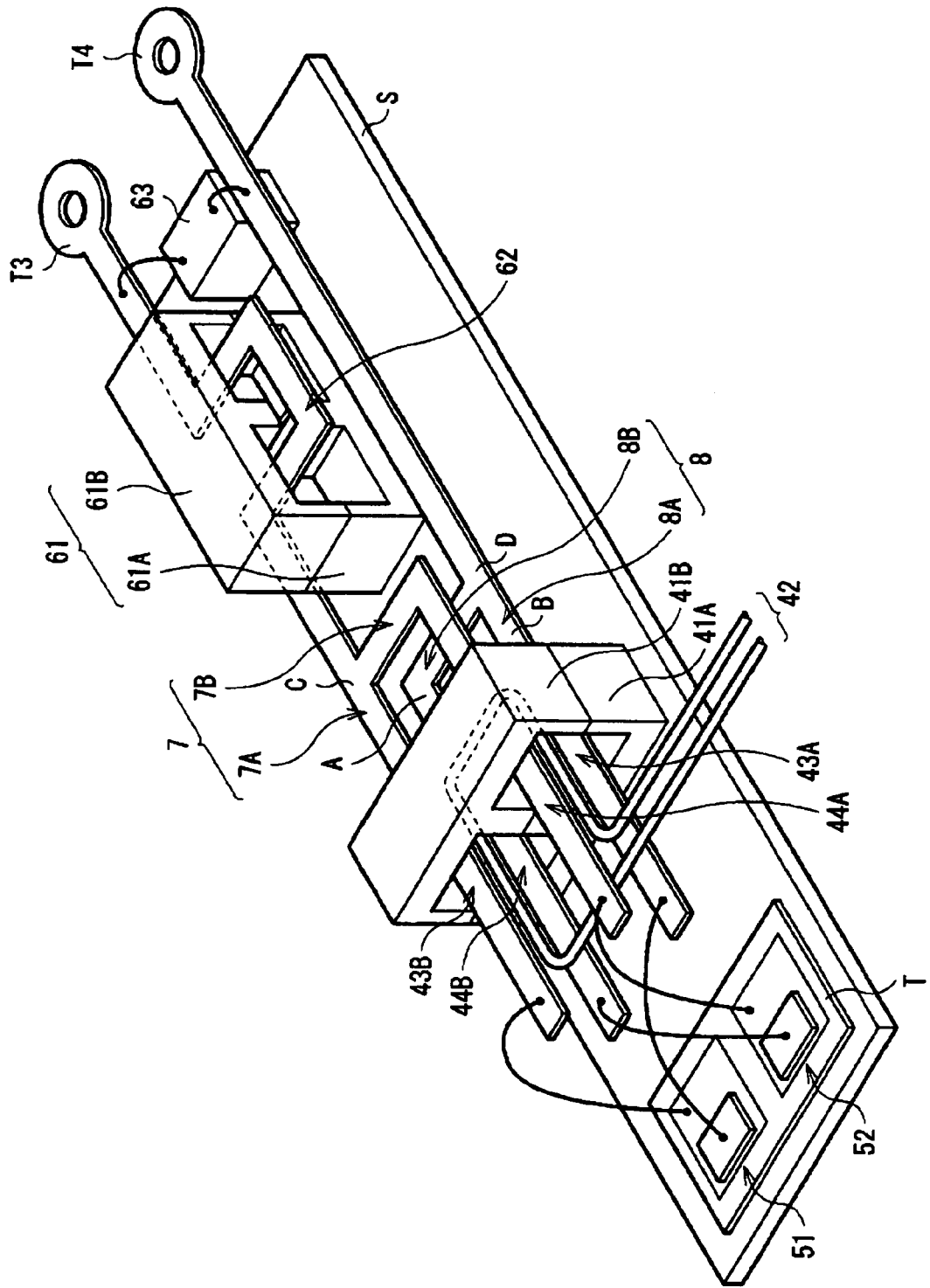
FIG. 6 shows a configuration of the switching power supply unit shown in FIG. 5.

In the above-mentioned first embodiment, the choke coil 62 of the smoothing circuit 6 is formed in such a way that the wiring on the output terminal T3 (the wiring member 7) side is wound around the magnetic core 61 by half a turn while the wiring on the output terminal T4 (the wiring member 8) side is wound around the magnetic core 61 by half a turn so that they can be cooperatively wound around the magnetic core 61 just by one turn as a whole. However, as shown in FIGS. 5 and 6, the choke coil may be formed in such a way that the magnetic core 61 is wound by the wiring only on the output terminal T3 (the wiring member 7) side by one turn as a whole.

Figure 7:
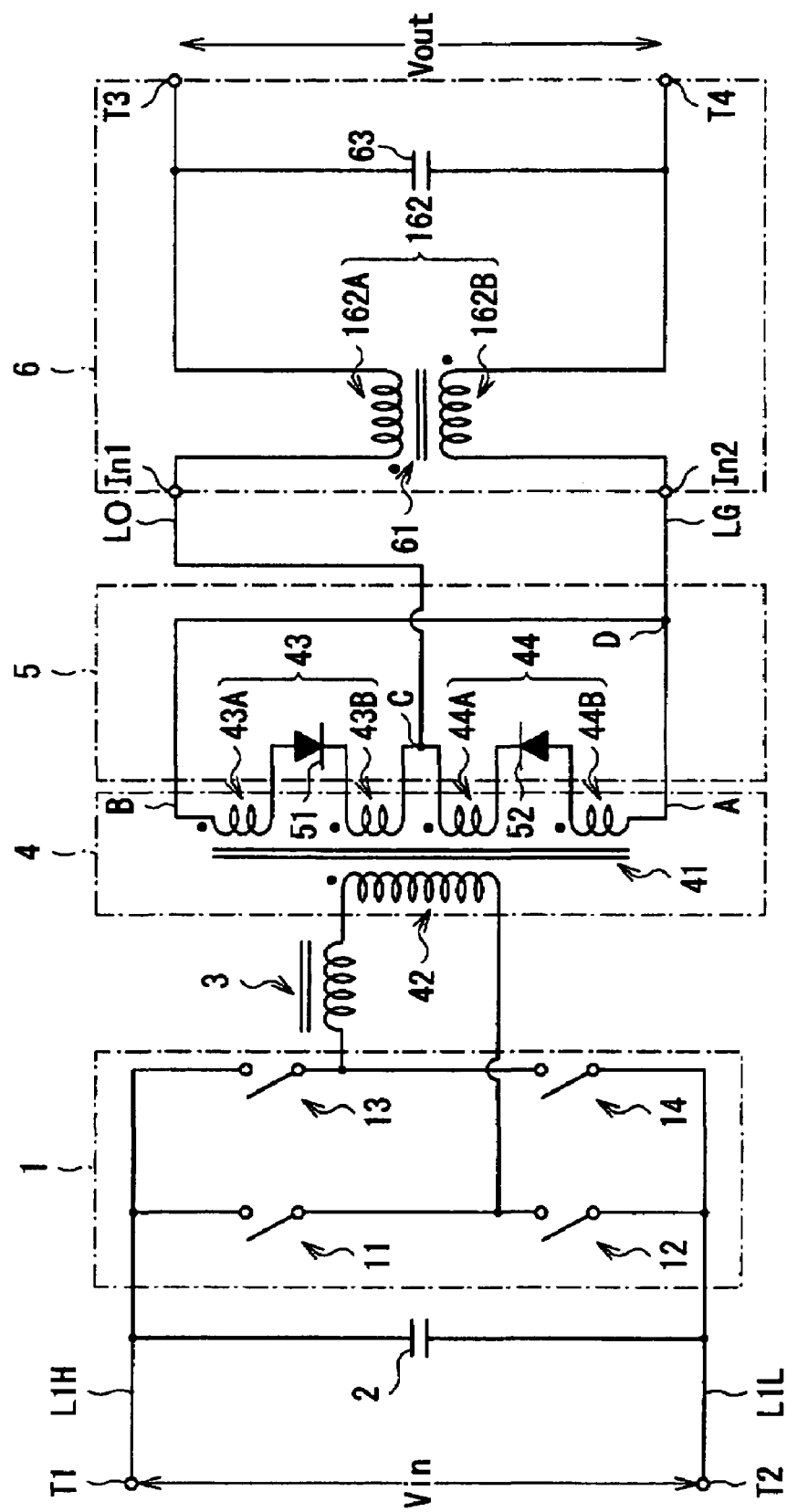
FIG. 7 is a circuit diagram of a switching power supply unit according to another modification.
Figure 8:
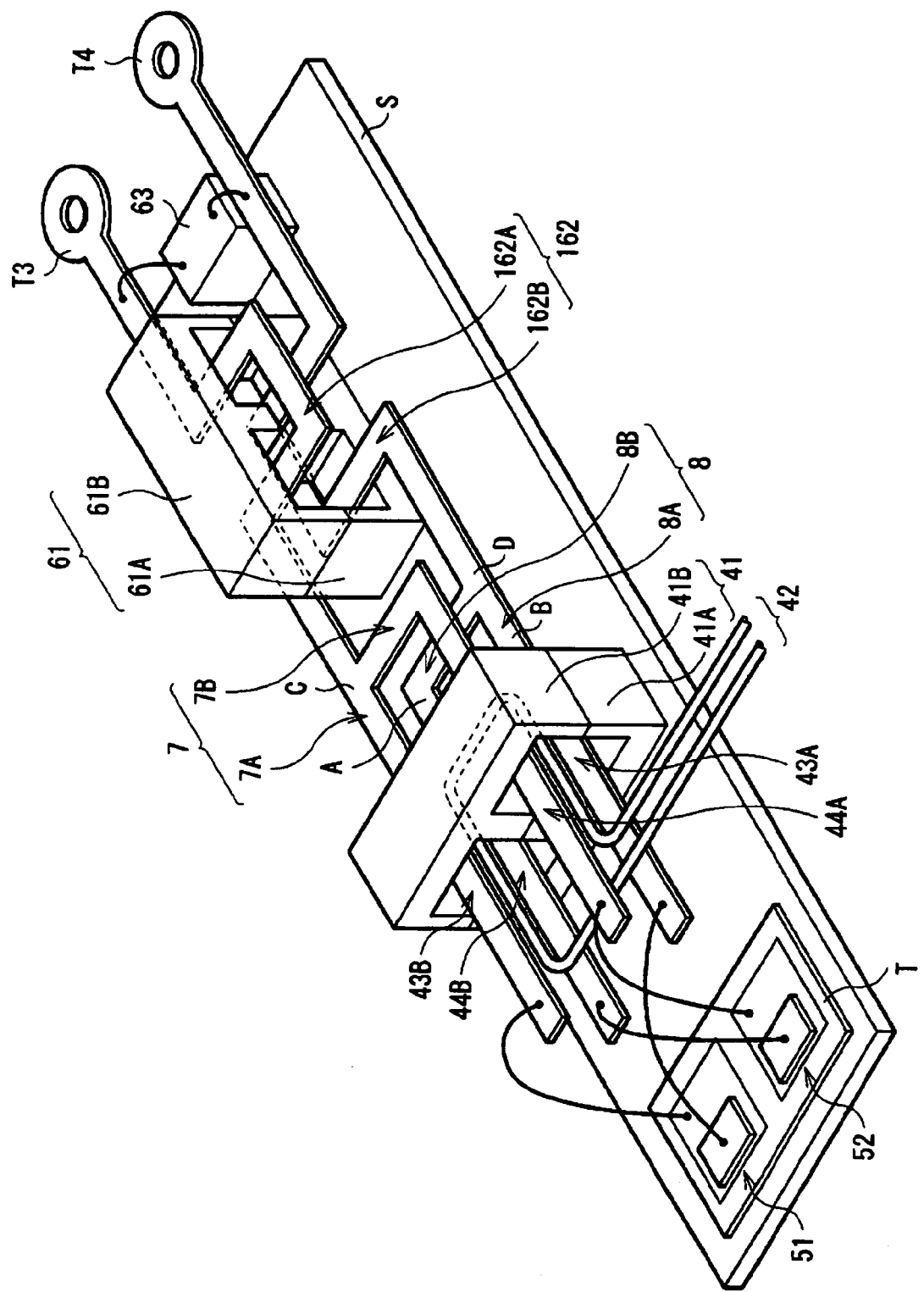
FIG. 8 shows a configuration of the switching power supply unit shown in FIG. 7.
Figure 9:
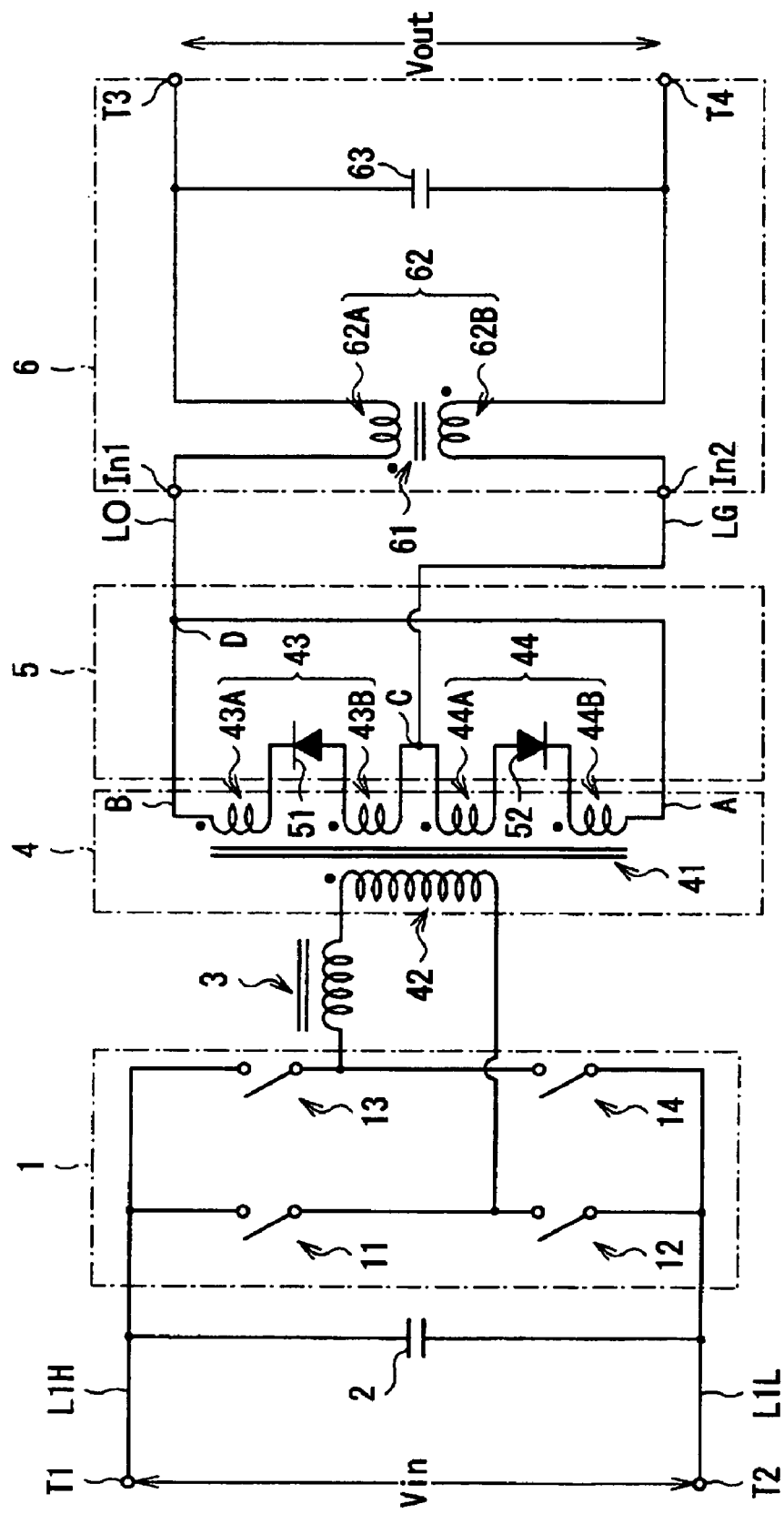
FIG. 9 is a circuit diagram of a switching power supply unit according to still another modification.
Figure 10:
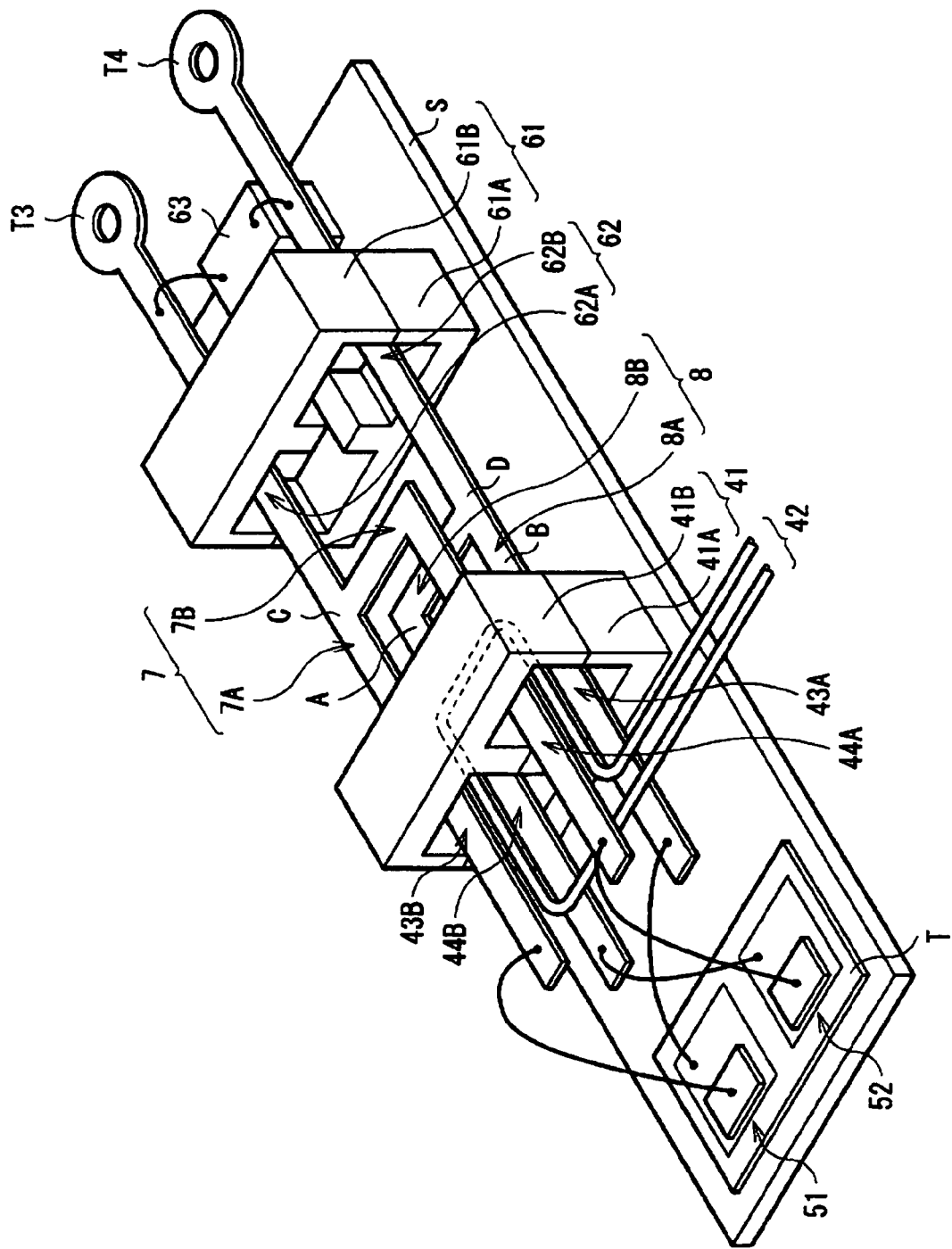
FIG. 10 shows a configuration of the switching power supply unit shown in FIG. 9.
Figure 11:
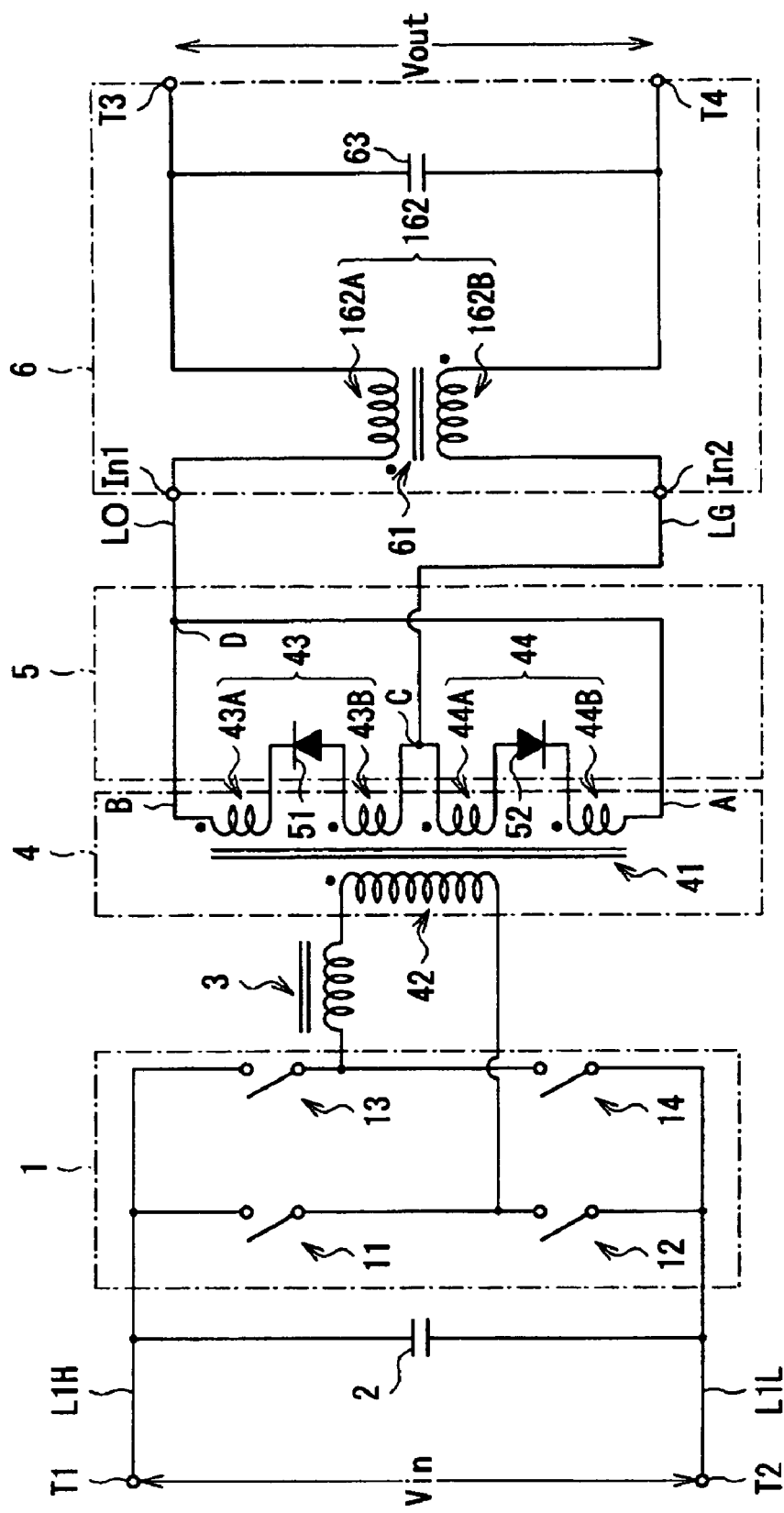
FIG. 11 is a circuit diagram of a switching power supply unit according to still another modification.
Figure 12:
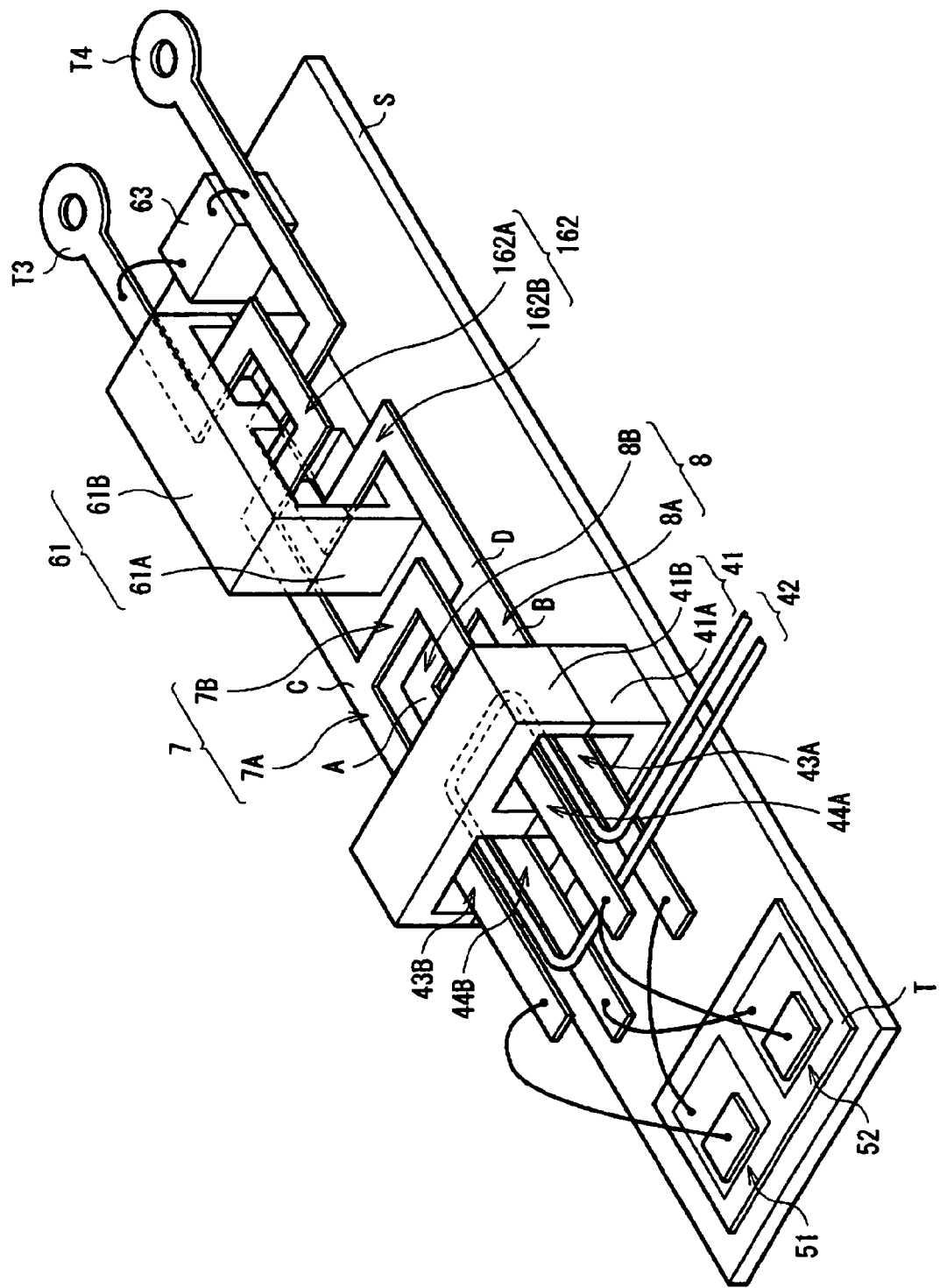
FIG. 12 shows a configuration of the switching power supply unit shown in FIG. 11.

In a case where a sufficient magnitude of inductor of the choke coil 62 is hardly obtainable just by one turned winding, as shown in FIGS. 7 and 8, there may be provided a two-turned choke coil 162 instead of the choke coil 62. The choke coil 162 includes a first choke coil 162A formed by winding around the magnetic core 61 with the wiring on the output terminal T3 (wiring member 7) side by one turn, and a second choke coil 162B formed by winding around the magnetic core 61 with the wiring on the output terminal T4 (wiring member 8) side by one turn. As described above, even in the case where the winding number of the choke coil 162 is two turns, it is possible to form each of the wiring members 7 and 8 by a single sheet metal, respectively. In this manner, as compared with the configurations in the past, the number of parts for wiring can be reduced from four parts to two parts similarly to the above-mentioned embodiment so that the structure can be simplified.

In addition, according to the above-mentioned first embodiment, an equivalent circuit on the secondary side of the transformer 4 is configured of an anode common connection type. However, as shown in FIGS. 9 and 10 or FIGS. 11 and 12, equivalent circuits on the secondary side of the transformer 4 may be configured of a cathode common connection type.

Second Embodiment

Figure 13:
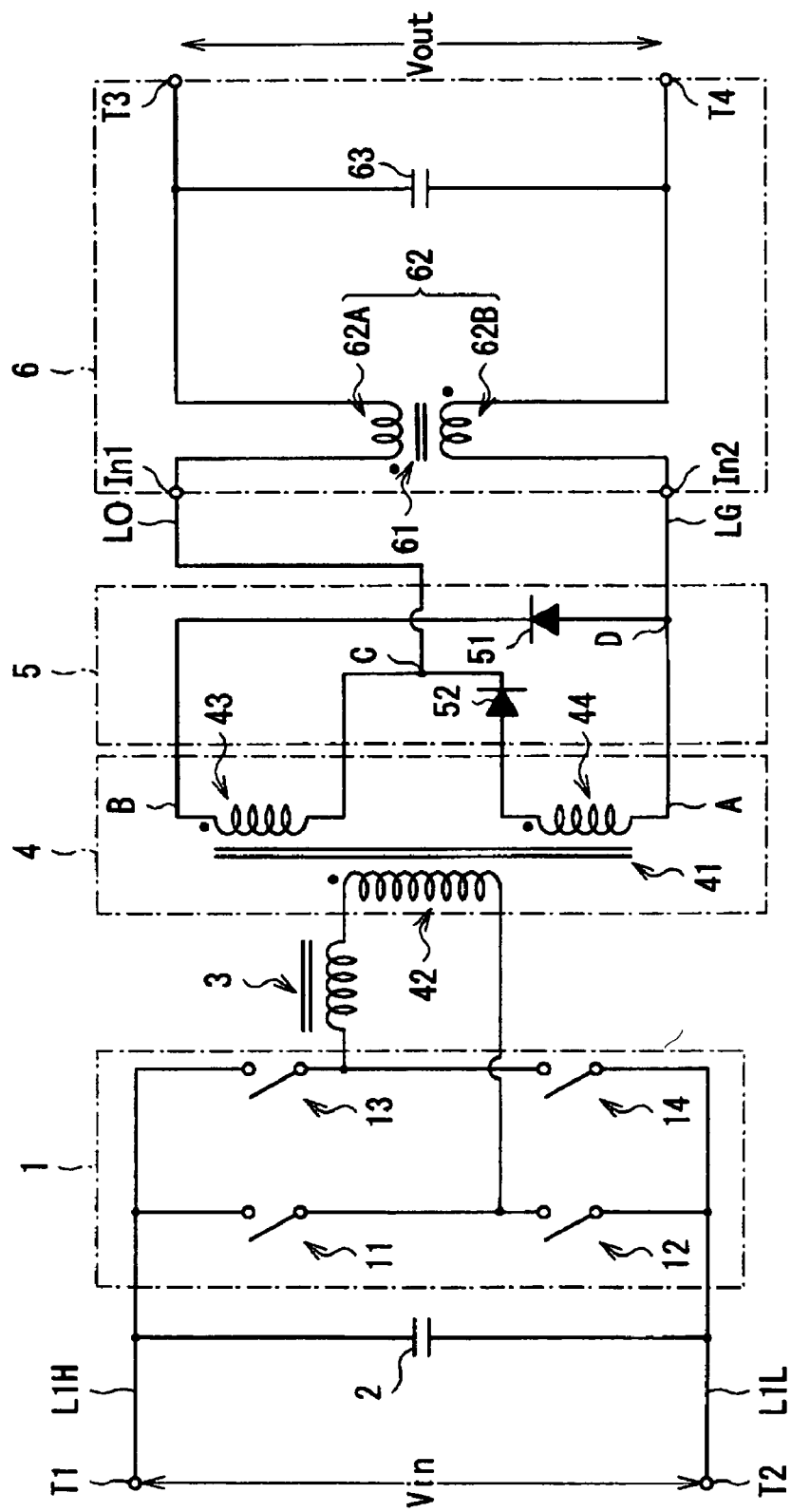
FIG. 13 is a circuit diagram of a switching power supply unit according to a second embodiment of the present invention.
Figure 14:
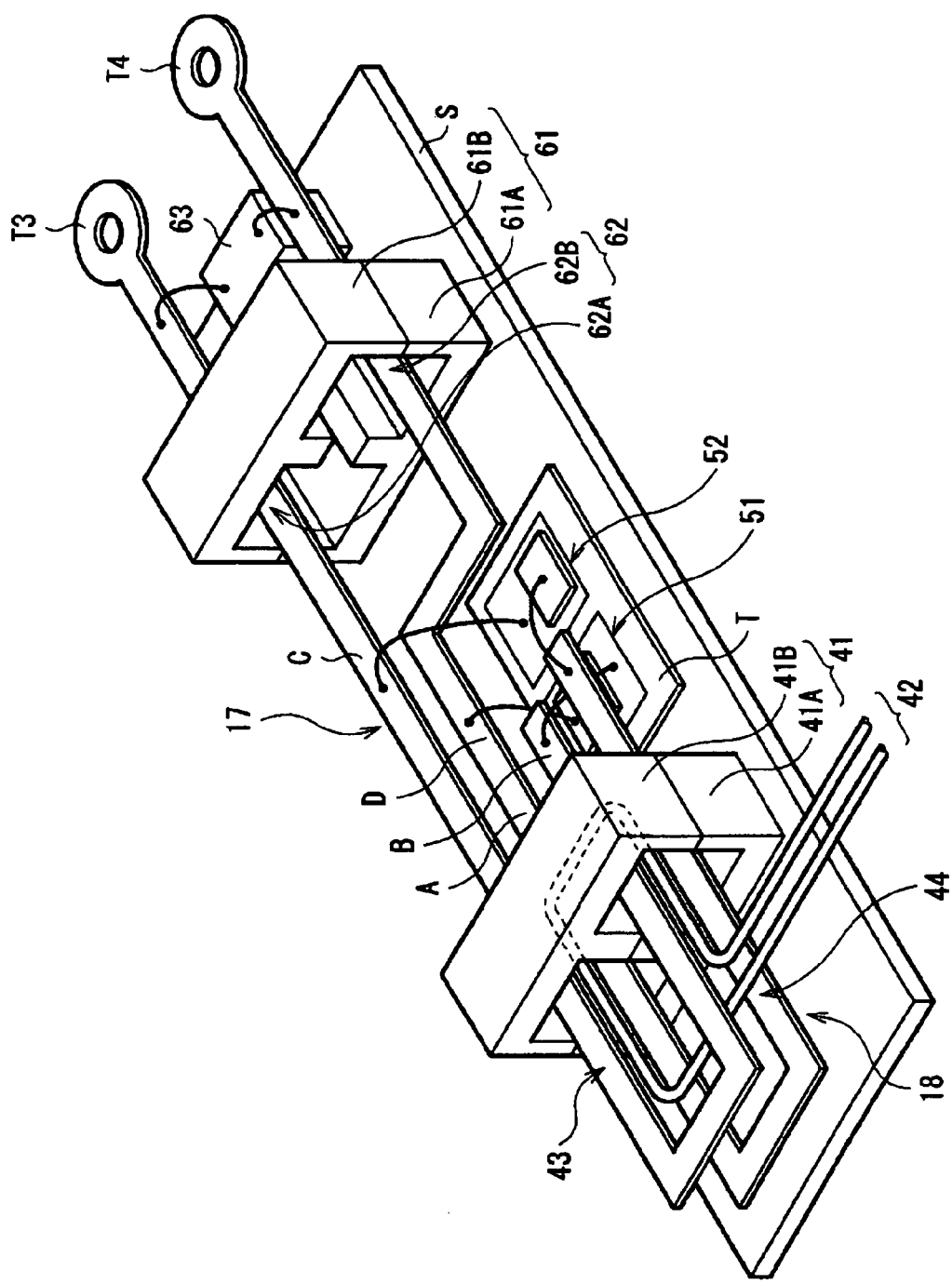
FIG. 14 shows a configuration of the switching power supply unit shown in FIG. 13.

FIG. 13 is a circuit diagram of a switching power supply unit according to a second embodiment of the present invention, and FIG. 14 shows a configuration of the switching power supply unit of FIG. 13. The switching power supply unit is different in the configuration of the secondary winding of the transformer 4 and in the configuration of the rectifier circuit 5 as compared with the above-mentioned first embodiment. Then, hereinafter, points different from the above-mentioned first embodiment will be mainly explained, and description of the configuration, operation, and effect which are common to the above-mentioned first embodiment will be suitably omitted.

A transformer 4 is a magnetic device in which a primary winding 42 and secondary windings 43 (a first secondary winding) and 44 (a second secondary winding) mutually connected in series are magnetically coupled each other by winding around a magnetic core 41 in such a way that all the windings have a polarity of the same direction each other.

The secondary winding 43 is formed by winding around the magnetic core 41 by one turn. One end of the secondary winding 43 is connected to a cathode of a below-mentioned diode 52 at a center tap C (a junction), and the center tap C is connected to an output terminal T3 (a first output end) via an output line LO. An end portion B of the secondary winding 43 (a second end portion) is connected to the cathode of a below-mentioned diode 51. The secondary winding 44 is formed by winding around the magnetic core 41 by one turn. One end portion of the secondary winding 44 is connected to the anode of the diode 52, and the end portion A of the secondary winding 44 (the first end portion) is connected to the anode of the diode 51 and further connected to an output terminal T4 (a second output end) via a ground line LG. That is, the secondary side of the transformer 4 is of a center tap connection type.

The rectifier circuit 5 is a single-phase full-wave rectifier composed of a pair of diodes 51 (a second rectifier device) and 52 (a first rectifier device). The rectifier circuit 5 is equivalent to the rectifier circuit 105 of a cathode common connection type which is configured by inserting the diode 51 between the secondary winding 43 and the center tap C, as shown in FIG. 3. Therefore, similarly to the rectifier circuit 105 shown in FIG. 3, the circuit configuration of the rectifier circuit 5 rectifies the separate half wave periods of the AC output voltages VO1 and VO2 of the transformer 4 by the diodes 51 and 52 respectively to output the rectified voltages from the center tap C and the junction point D.

Next, effects of the switching power supply unit of the second embodiment will be explained as compared with a comparative example.

In the comparative example, as shown in FIG. 4, the secondary windings (the secondary windings 43 and 44) of the transformer 4 and wiring of the smoothing circuit 106 are divided by the diodes 51 and 52 of the rectifier circuit 105. That is, the secondary winding of the transformer 4 and the wiring of the smoothing circuit 106 are formed of a separate wiring, respectively, thereby large number of parts is needed for wiring and the structure is intricate. In addition, in order to electrically connect the wiring divided in this way, electrical connection by means of screw fastening, solder or welding, etc. is necessary between the wirings which are respectively extended from the diodes 51 and 52, the secondary windings 43 and 44, the choke coil 62 and the output terminals T3 and T4, and the smoothing capacitor 63 each other.

On the other hand, according to the second embodiment, as shown in FIG. 14, a path from the end portion B of the secondary winding 43 to the output terminal T3 via the center tap C is formed of a wiring member 17 (a first wiring member) made of a single sheet metal. A path from one of the ends of the secondary winding 44 connected to the diode 52 to the output terminal T4 via the end portion A is formed of a wiring member 18 (a second wiring member) made of a single sheet metal. That is, the secondary windings (the secondary windings 43 and 44) of the transformer 4 and the wiring of the smoothing circuit 6 are formed of two sheet metals (wiring members 17 and 18). At this time, the diodes 51 and 52 of the rectifier circuit 5 are disposed in the vicinity of the end portions of the wiring members 17 and 18.

According to the second embodiment, as described above, since the secondary winding (secondary windings 43 and 44) of the transformer 4 and the wiring of the smoothing circuit 6 are formed of two sheet metals (the wiring members 17 and 18), the number of parts for wiring can be reduced from four parts to two parts. As a result, the structure can be simplified compared with configurations in the past.

In this manner, according to the second embodiment, what is necessary is just to electrically connect the diodes 51 and 52, the wiring members 17 and 18 and the smoothing capacitor 63 each other by means of screw fastening, solder or welding, etc. Thereby man-hour requirement for the connecting operation can be reduced. In addition, since the number of junction points of wiring is decreased, generation of heat and power loss caused by the contact resistance in the junction point of wiring can be reduced. Moreover, since occurrence possibility of loosened screw or solder crack is reduced, reliability can be raised.

Modification of Second Embodiment

Figure 15:
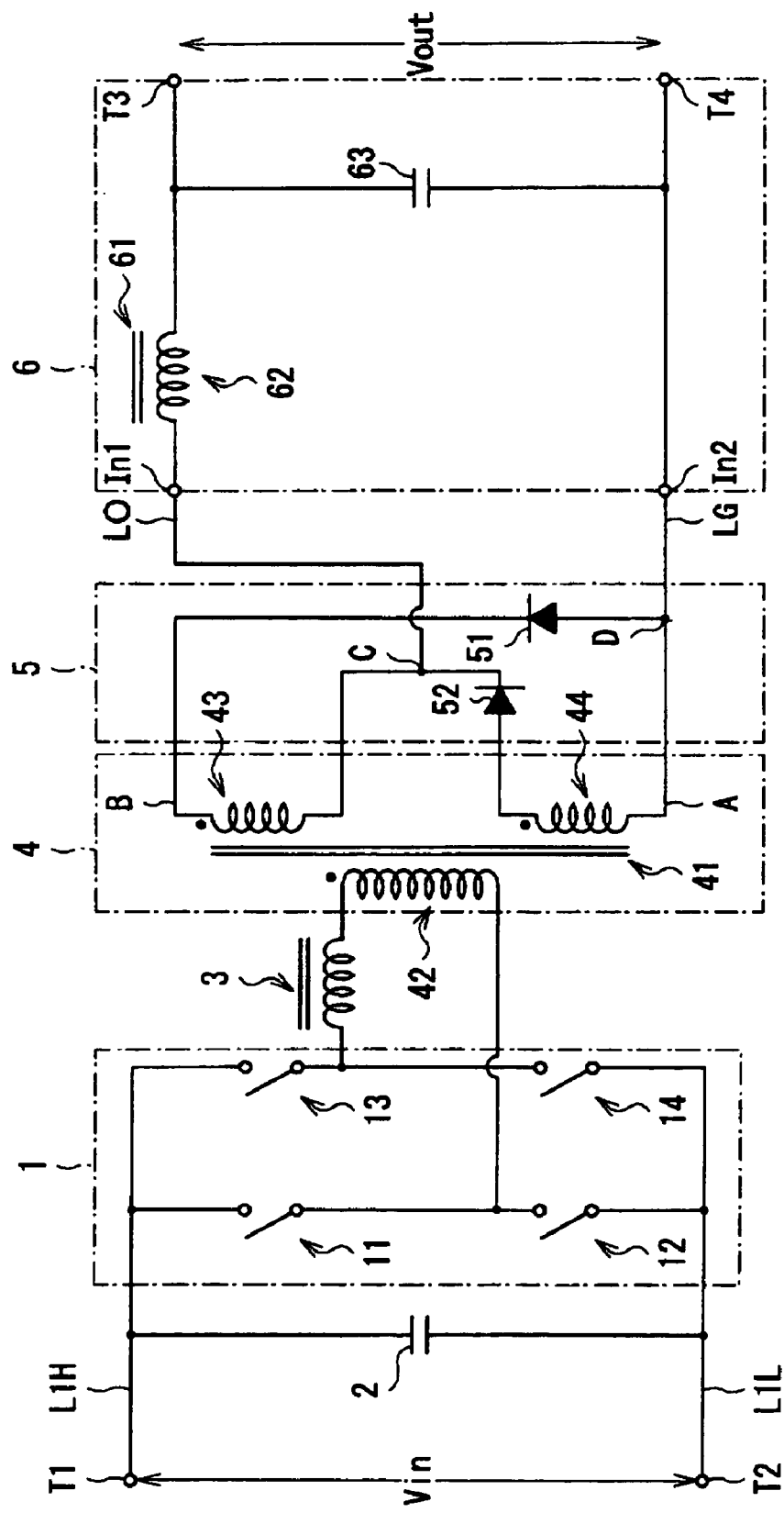
FIG. 15 is a circuit diagram of a switching power supply unit according to a modification.
Figure 16:
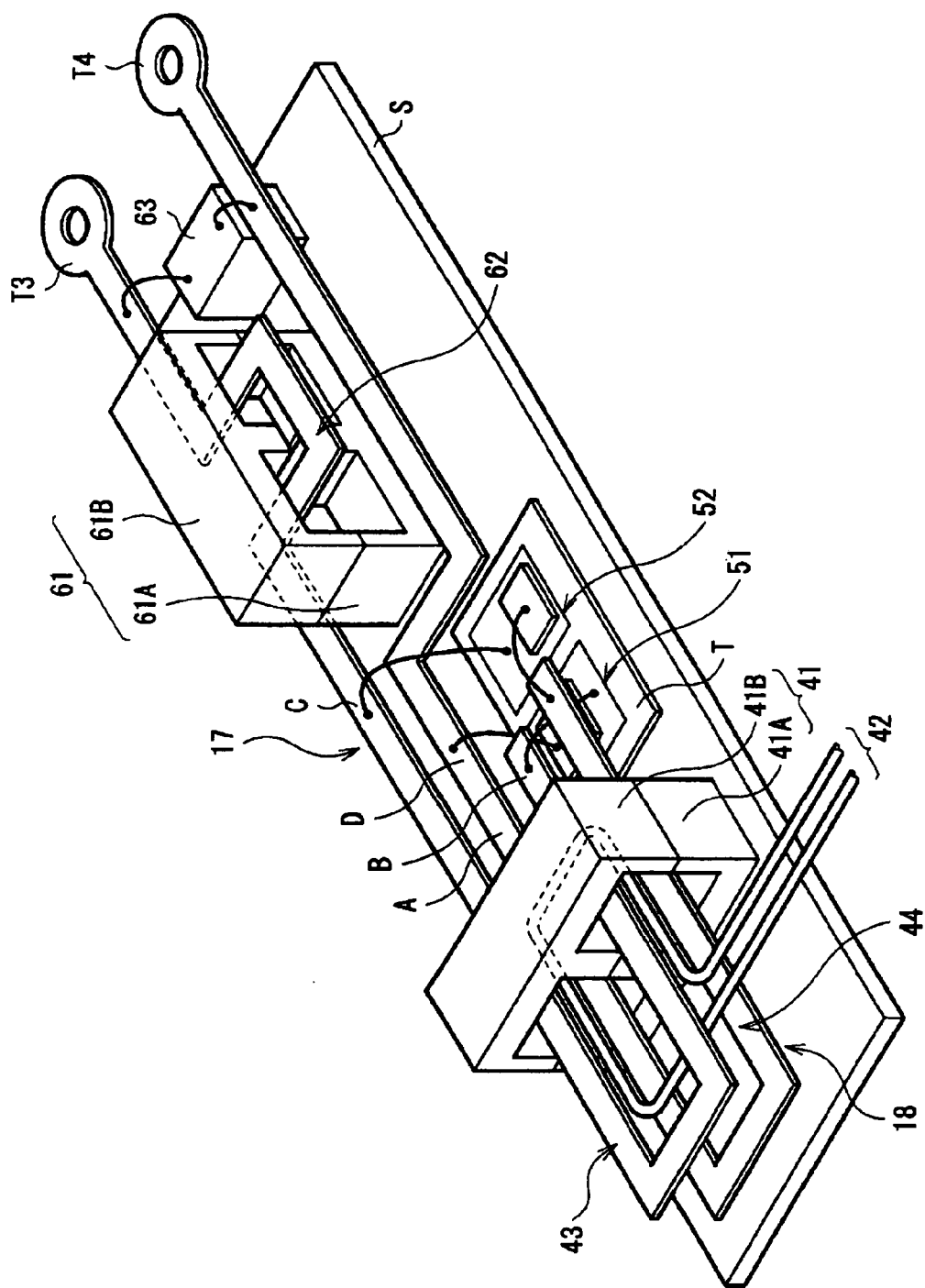
FIG. 16 shows a configuration of the switching power supply unit shown in FIG. 15.

In the choke coil 62 of the smoothing circuit 6, according to the second embodiment, the wiring on output terminal T3 (the wiring member 17) side is wound around the magnetic core 61 by half a turn and the wiring on the output terminal T4 (the wiring member 18) side is wound around the magnetic core 61 by half a turn so that both may be cooperatively wound around the magnetic core 61 by just one turn as a whole. However, as shown in FIGS. 15 and 16, the choke coil 62 may be formed in such a way that the wiring only on the output terminal T3 (the wiring member 17) side is wound around the magnetic core 61 by one turn as a whole.

Figure 17:
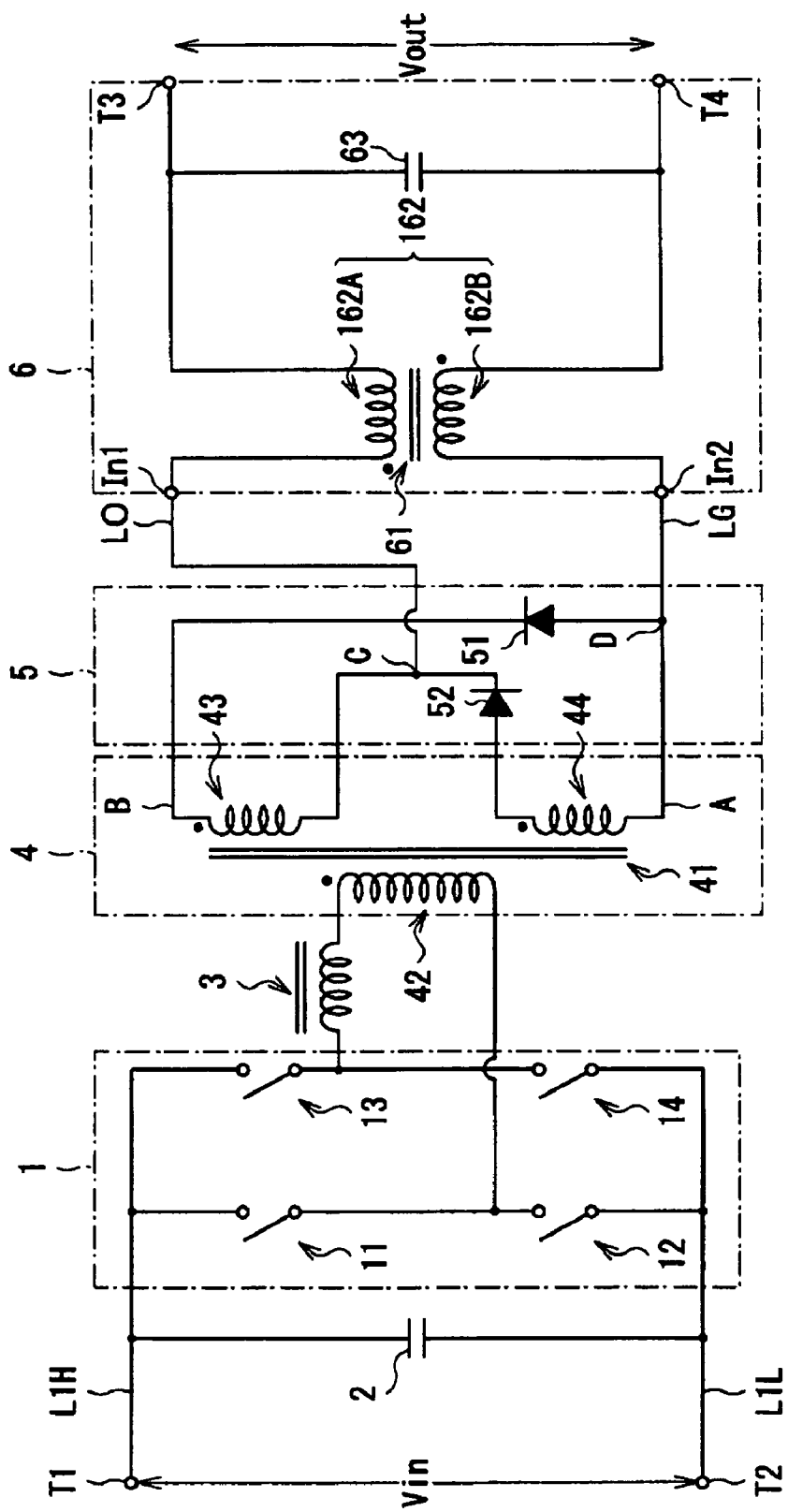
FIG. 17 is a circuit diagram of a switching power supply unit according to another modification.
Figure 18:
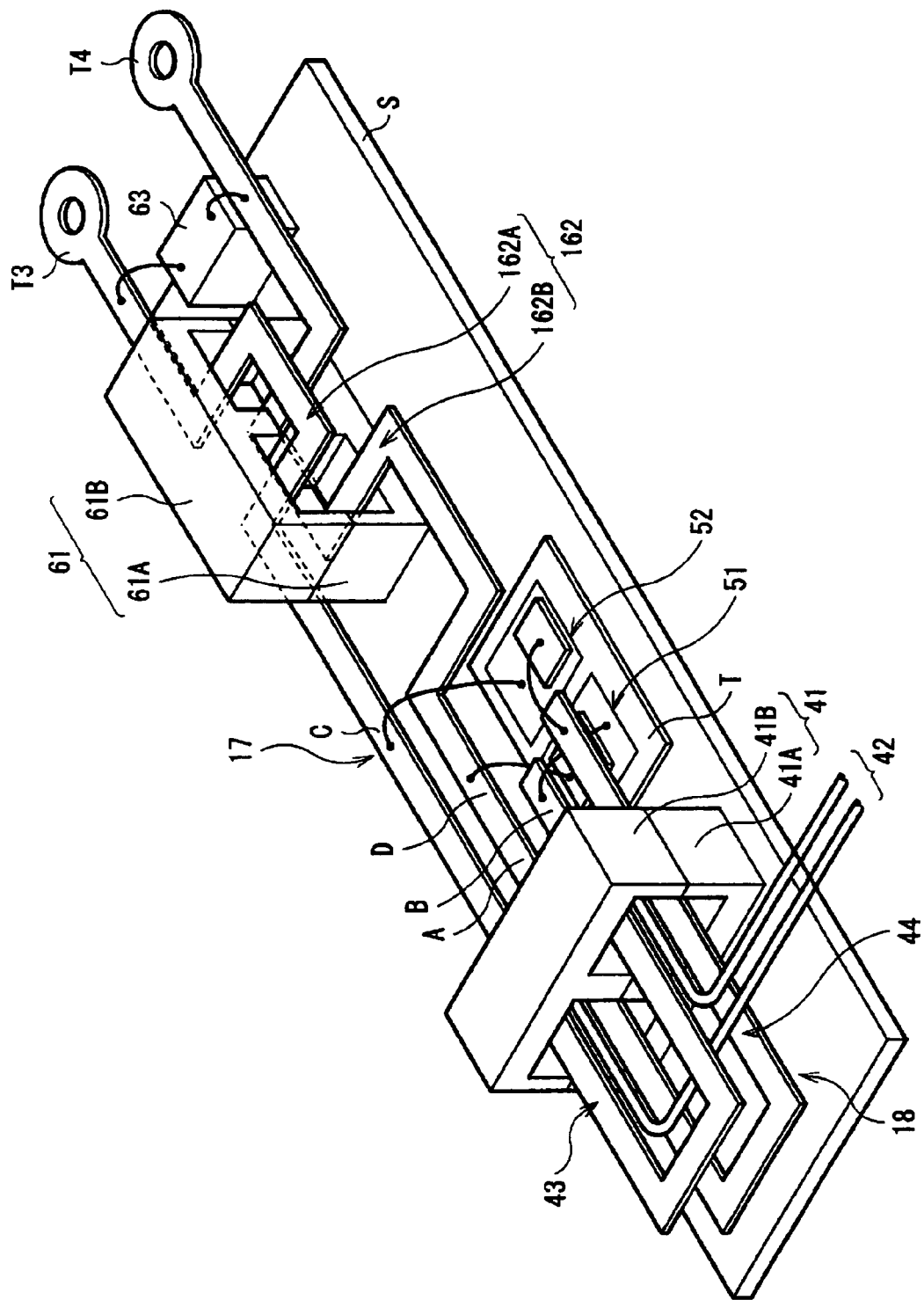
FIG. 18 shows a configuration of the switching power supply unit shown in FIG. 17.
Figure 19:
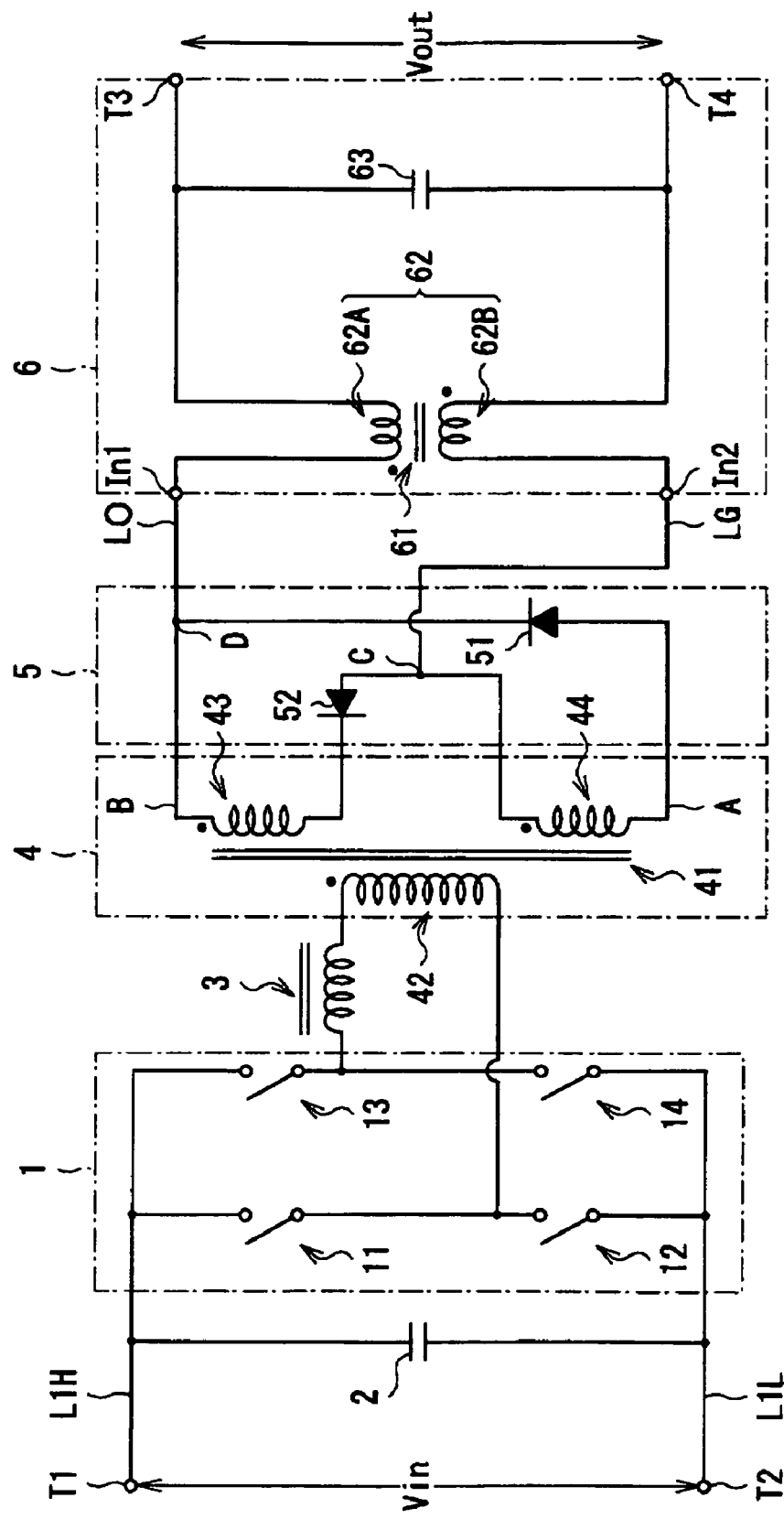
FIG. 19 is a circuit diagram of a switching power supply unit according to sill another modification.
Figure 20:
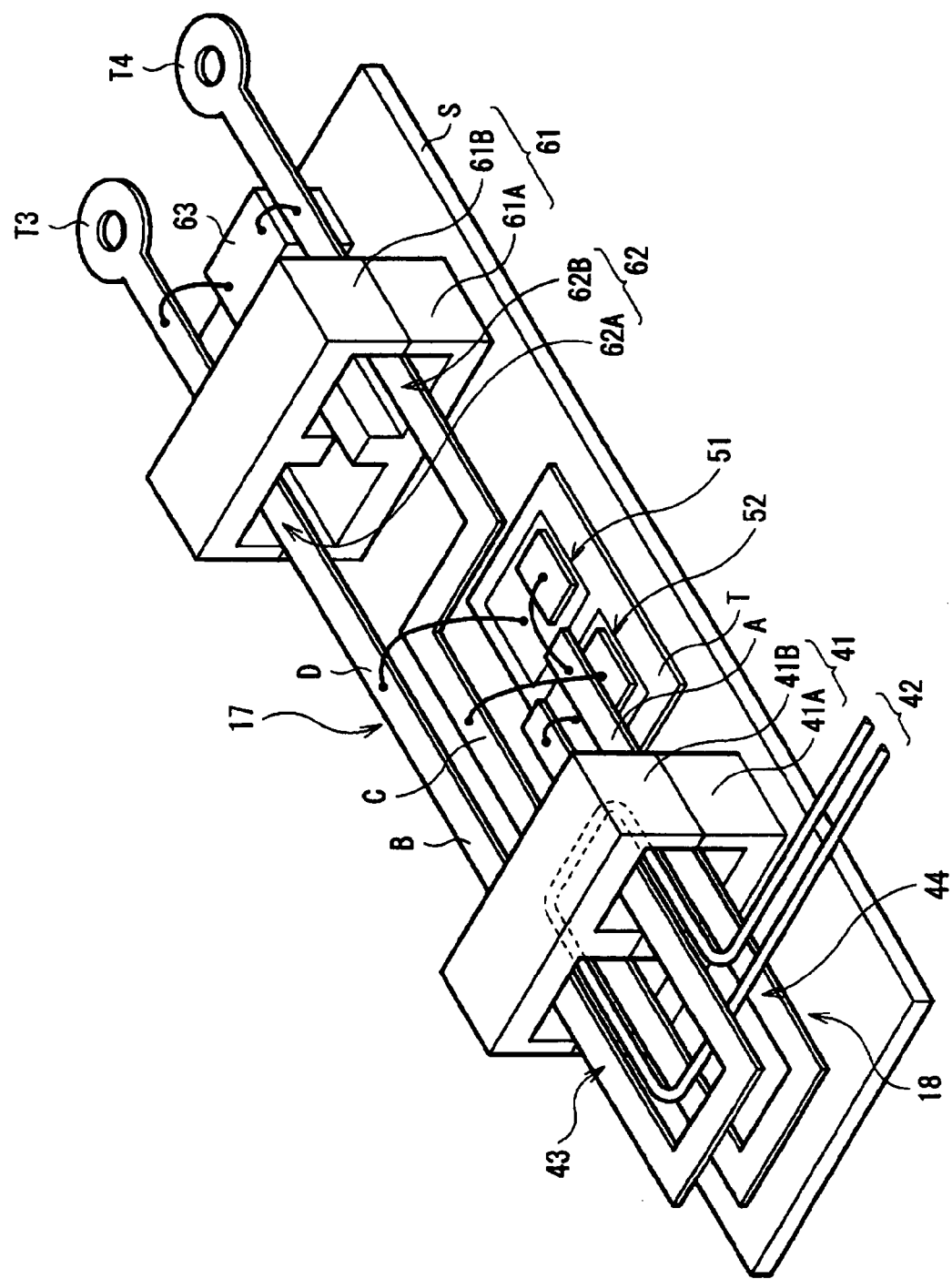
FIG. 20 shows a configuration of the switching power supply unit shown in FIG. 19.
Figure 21:
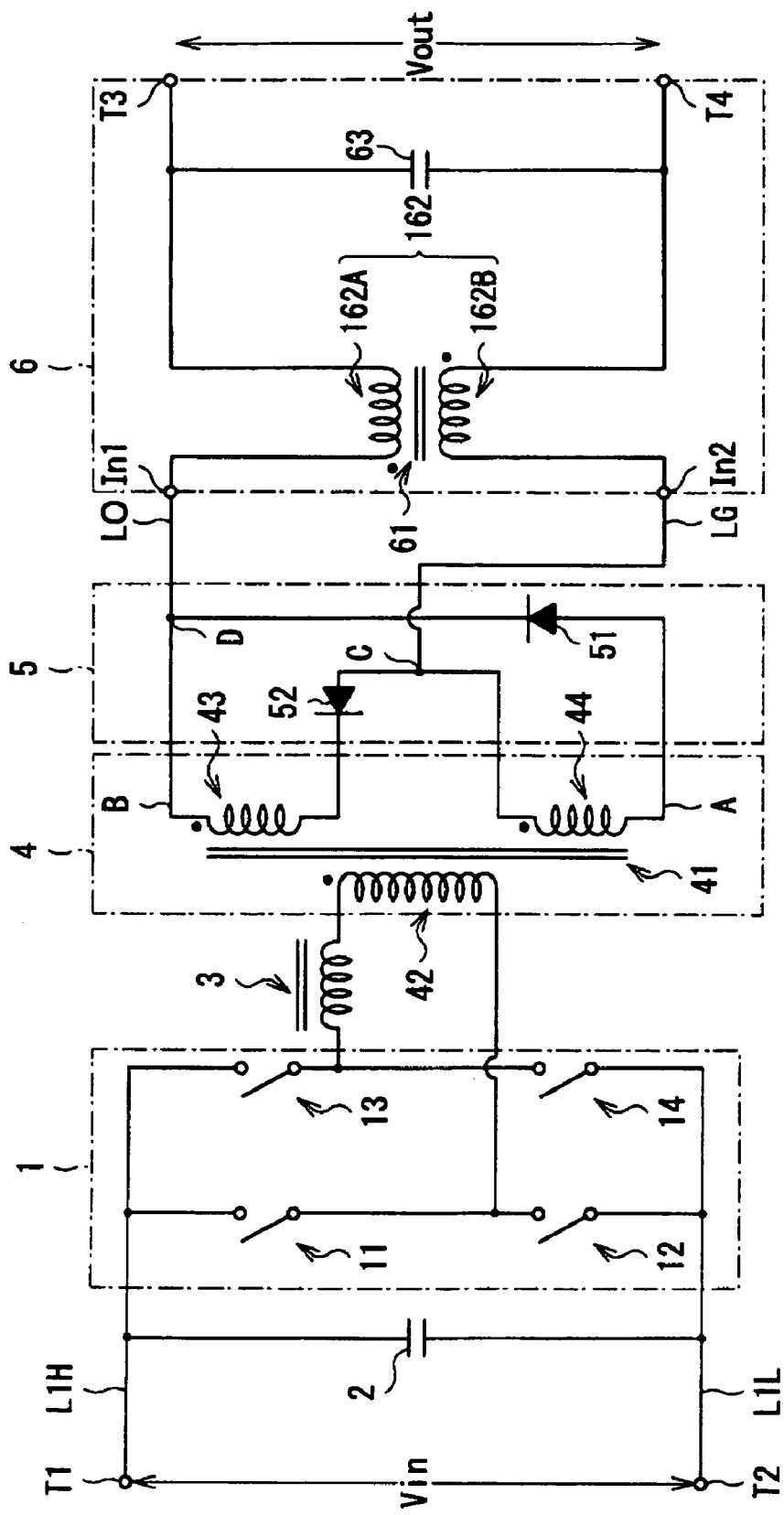
FIG. 21 is a circuit diagram of a switching power supply unit according to still another modification.
Figure 22:
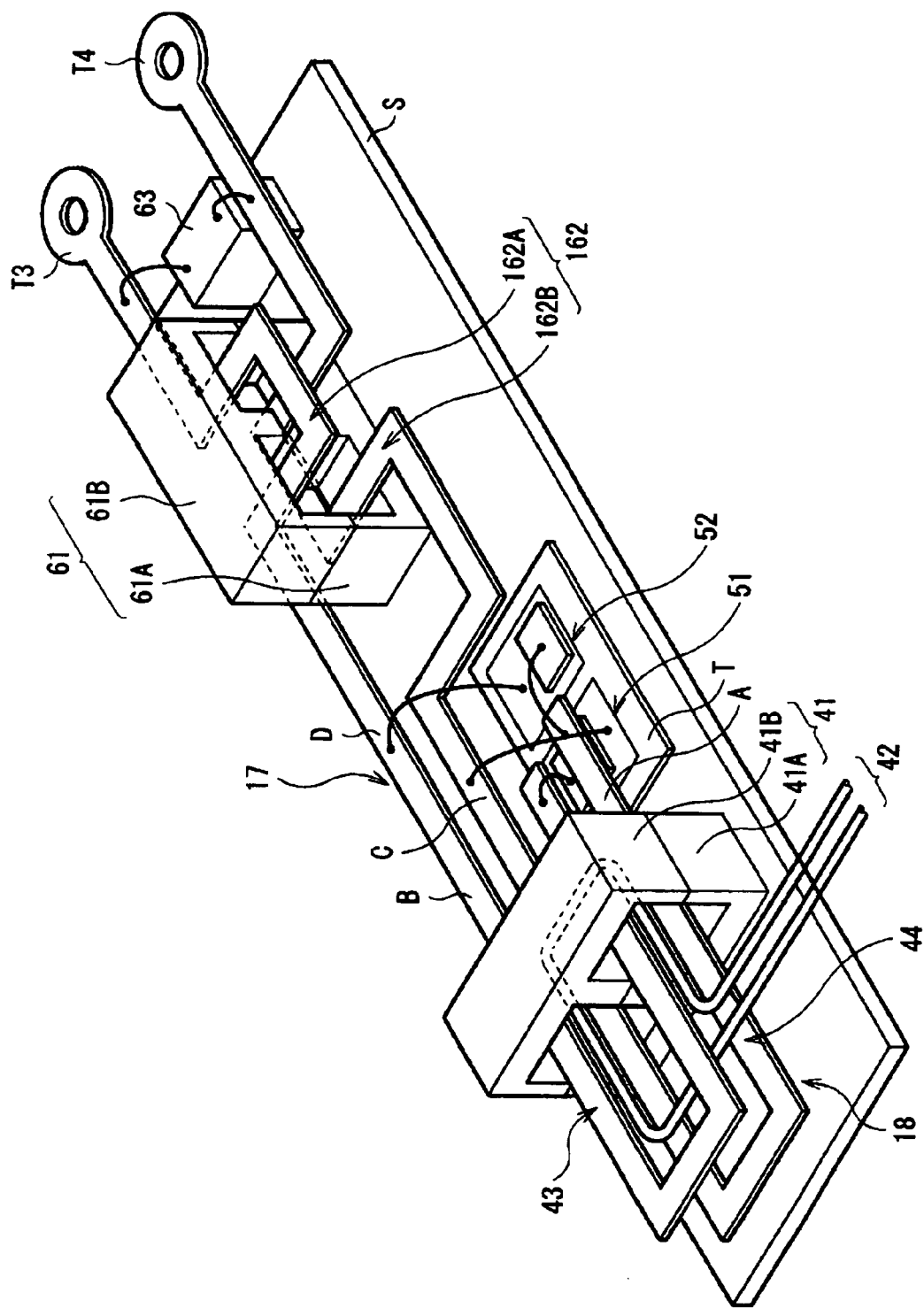
FIG. 22 shows a configuration of the switching power supply unit shown in FIG. 21.

In a case where a sufficient magnitude of inductor of the choke coil 62 is hardly obtainable just by one turn winding, as shown in FIGS. 17 and 18, there may be provided a two-turned choke coil 162 instead of the choke coil 62. The choke coil 162 includes a first choke coil 162A formed by winding around the magnetic core 61 with the wiring on the output terminal T3 (wiring member 17) side by one turn, and a second choke coil 162B formed by winding around the magnetic core 61 with the wiring on the output terminal T4 (wiring member 18) side by one turn. As described above, even in the case where the winding number of the choke coil 62 is two turns, it is possible to form each of the wiring members 17 and 18 by a single sheet metal, respectively. In this manner, as compared with configurations in the past, the number of parts for wiring can be reduced from four parts to two parts similarly to the above-mentioned second embodiment so that the structure can be simplified.

According to the above-mentioned second embodiment, an equivalent circuit on the secondary side of the transformer 4 is configured of an anode common connection type, but as shown in FIGS. 19 and 20, or FIGS. 21 and 22, equivalent circuit on the secondary side of the transformer 4 may be configured of a cathode common connection type.

Third Embodiment

Figure 23:
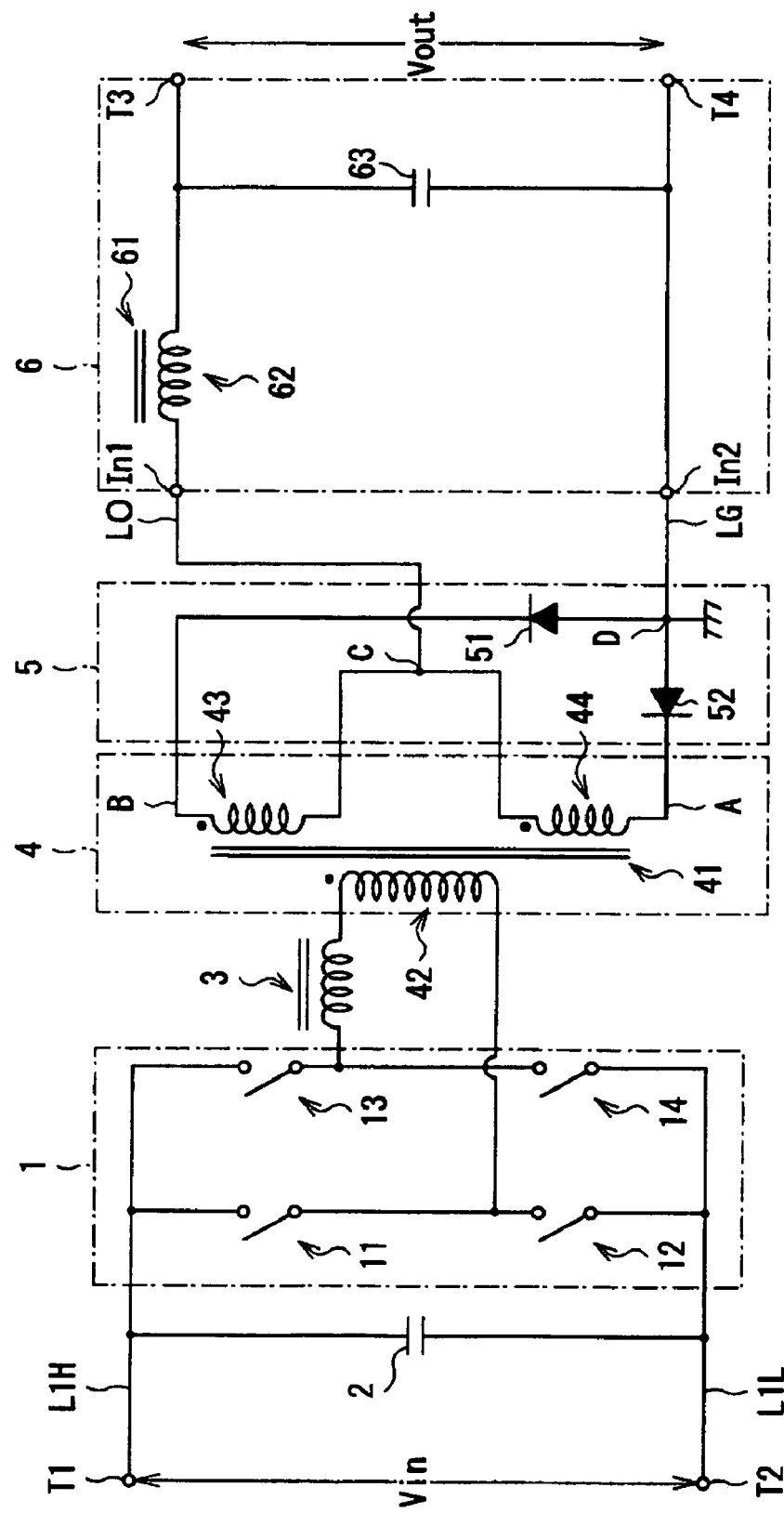
FIG. 23 is a circuit diagram of a switching power supply unit according to a third embodiment of the present invention.
Figure 24:
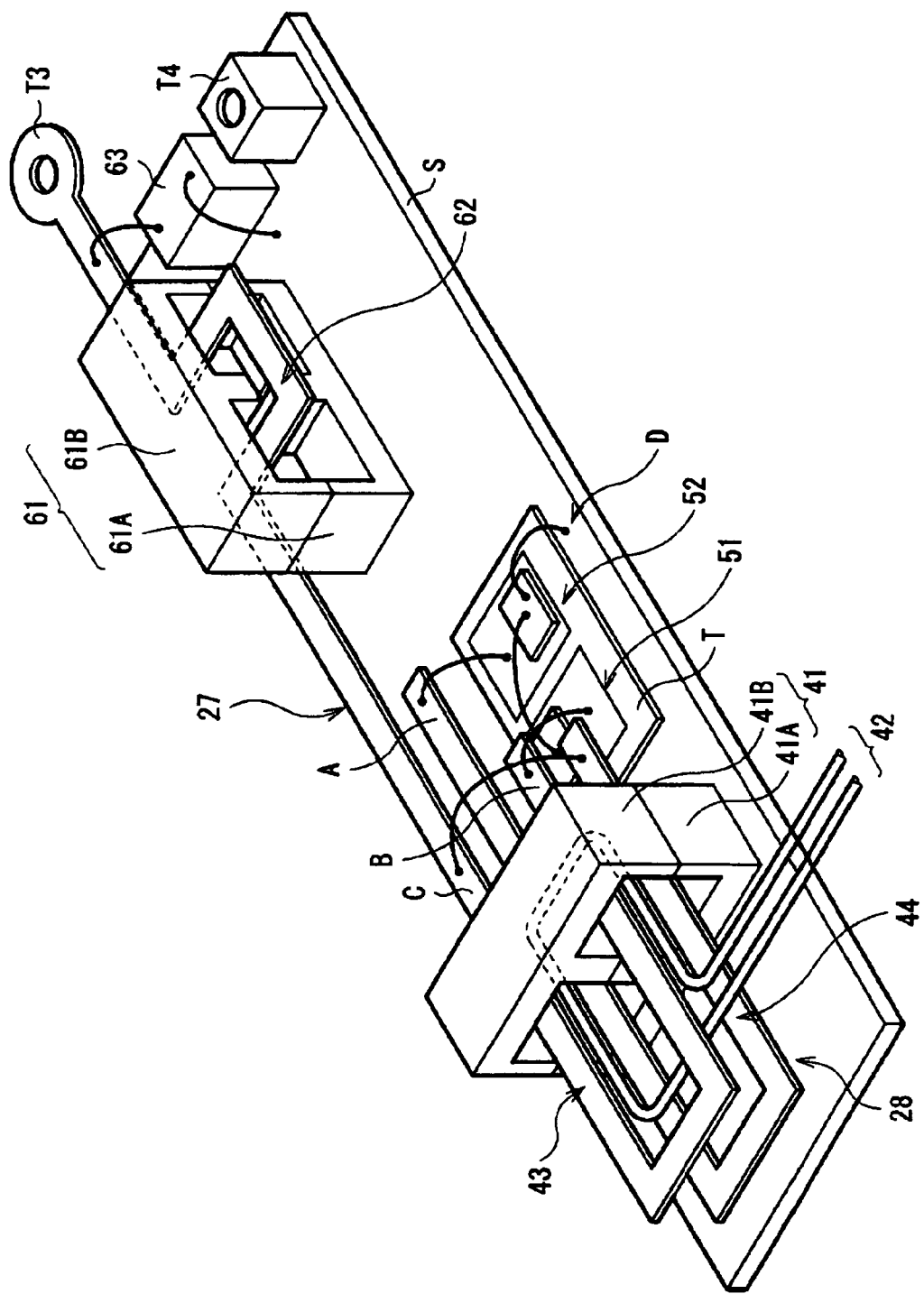
FIG. 24 shows a configuration of the switching power supply unit shown in FIG. 23.

FIG. 23 is a circuit diagram of a switching power supply unit according to a third embodiment of the present invention, and FIG. 24 shows a configuration of the switching power supply unit of FIG. 23. The switching power supply unit is different in the configuration of the secondary winding of the transformer 4 and in the configuration of the rectifier circuit 5 as compared with the above-mentioned first embodiment. Then, hereinafter, points different from the above-mentioned first embodiment will be mainly explained, and description of the configuration, operation, and effect that are common to the above-mentioned first embodiment will be suitably omitted. It is to be noted, as a premise, that a substrate S is electrically connected to the ground.

A transformer 4 is a magnetic device in which a primary winding 42 and secondary windings 43 (a first secondary winding) and 44 (a second secondary winding) mutually connected in series are magnetically coupled each other by winding around a magnetic core 41 in such a way that all the windings have a polarity of the same direction each other.

The secondary winding 43 is formed by winding around the magnetic core 41 by one turn. One end of the secondary winding 43 is connected to one end of the secondary winding 44 at a center tap C (a junction), and the center tap C is connected to an output terminal T3 (a first output end) via an output line LO. An end portion B of the secondary winding 43 (a second end portion) is connected to the cathode of a below-mentioned diode 51. The secondary winding 44 is formed by winding around the magnetic core 41 by one turn. One end of the secondary winding 44 is connected to one end of the secondary winding 43 at the center tap C, and the end portion A (a first end portion) of the secondary winding 44 is connected to the cathode of a diode 52. That is, the secondary side of the transformer 4 is of a center tap connection type.

The rectifier circuit 5 is a single-phase full-wave rectifier composed of a pair of diodes 51 (a second rectifier device) and 52 (a first rectifier device). The anode of the diode 51 is connected to the anode of the diode 52 at a junction point D, and further connected to an output terminal T4 (a second output end) via a ground line LG. The ground line LG is electrically connected to a substrate S.

Figure 25:
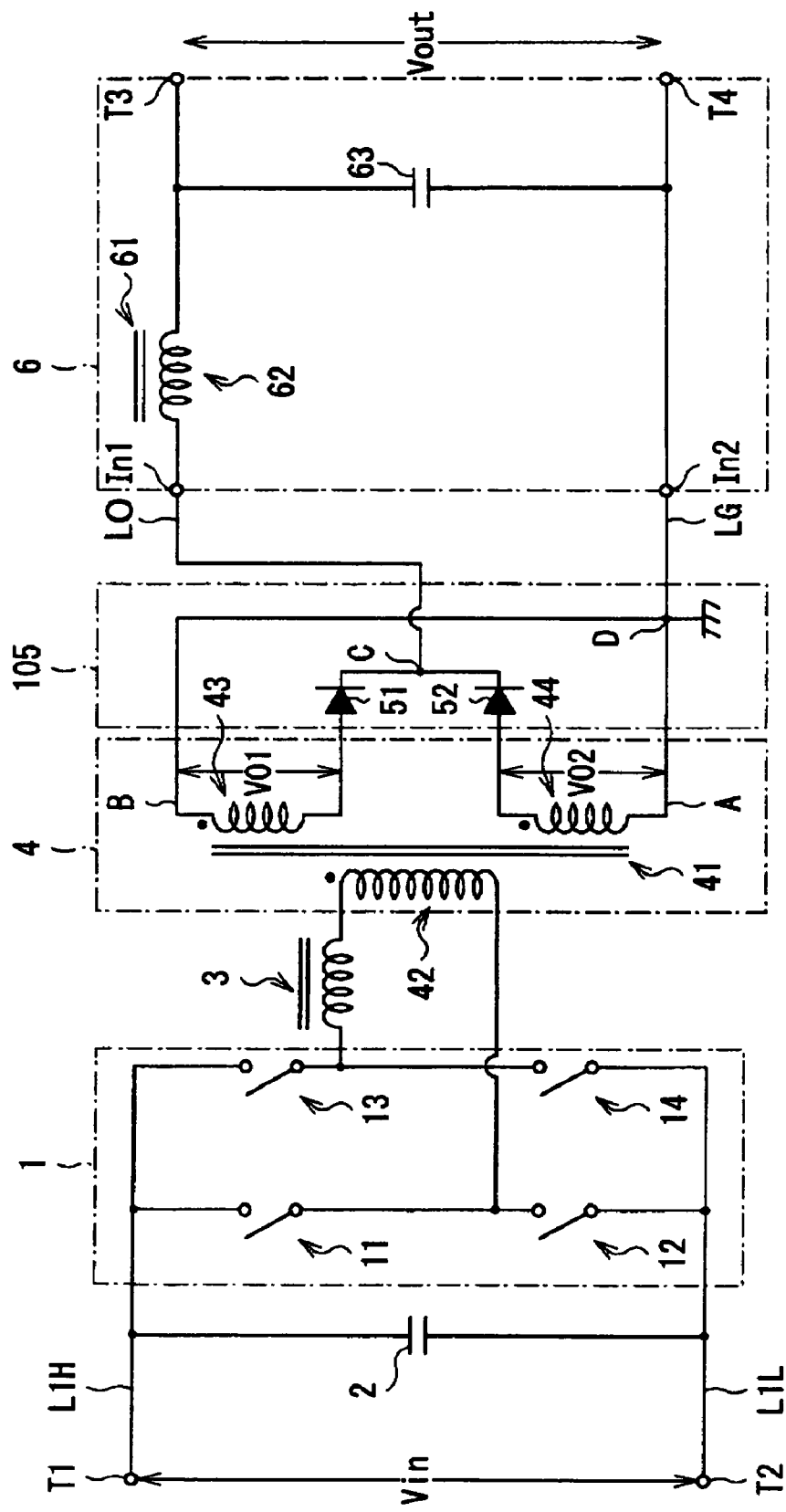
FIG. 25 is a circuit diagram of a switching power supply unit according to a comparative example.

The rectifier circuit 5 is equivalent to a rectifier circuit 105 of anode common connection type which is configured by inserting a diode 51 between a secondary winding 43 and a center tap C, and inserting a diode 52 between a secondary winding 44 and the center tap C, as shown in FIG. 25. Therefore, similarly to the rectifier circuit 105 shown in FIG. 25, the circuit configured of the rectifier circuit 5 rectifies the separate half wave periods of the AC output voltages VO1 and VO2 of the transformer 4 by the diodes 51 and 52 respectively to output the rectified voltages from the center tap C and the junction point D.

The smoothing circuit 6 includes a magnetic core 61, a choke coil 62 and a smoothing capacitor 63. With such a configuration, the smoothing circuit 6 smoothes the rectified voltage inputted into a first input end In1 and a second input end In2 so as to generate a DC output voltage Vout. The DC output voltage Vout is then supplied through the output terminals T3 and T4 to a load L. The choke coil 62 is formed in such a way that the wiring provided between the first input end In1 and the output terminal T3 is wound around the magnetic core 61 by one turn as a whole.

Next, effects of the switching power supply unit of the third embodiment will be explained as compared with a comparative example.

Figure 26:
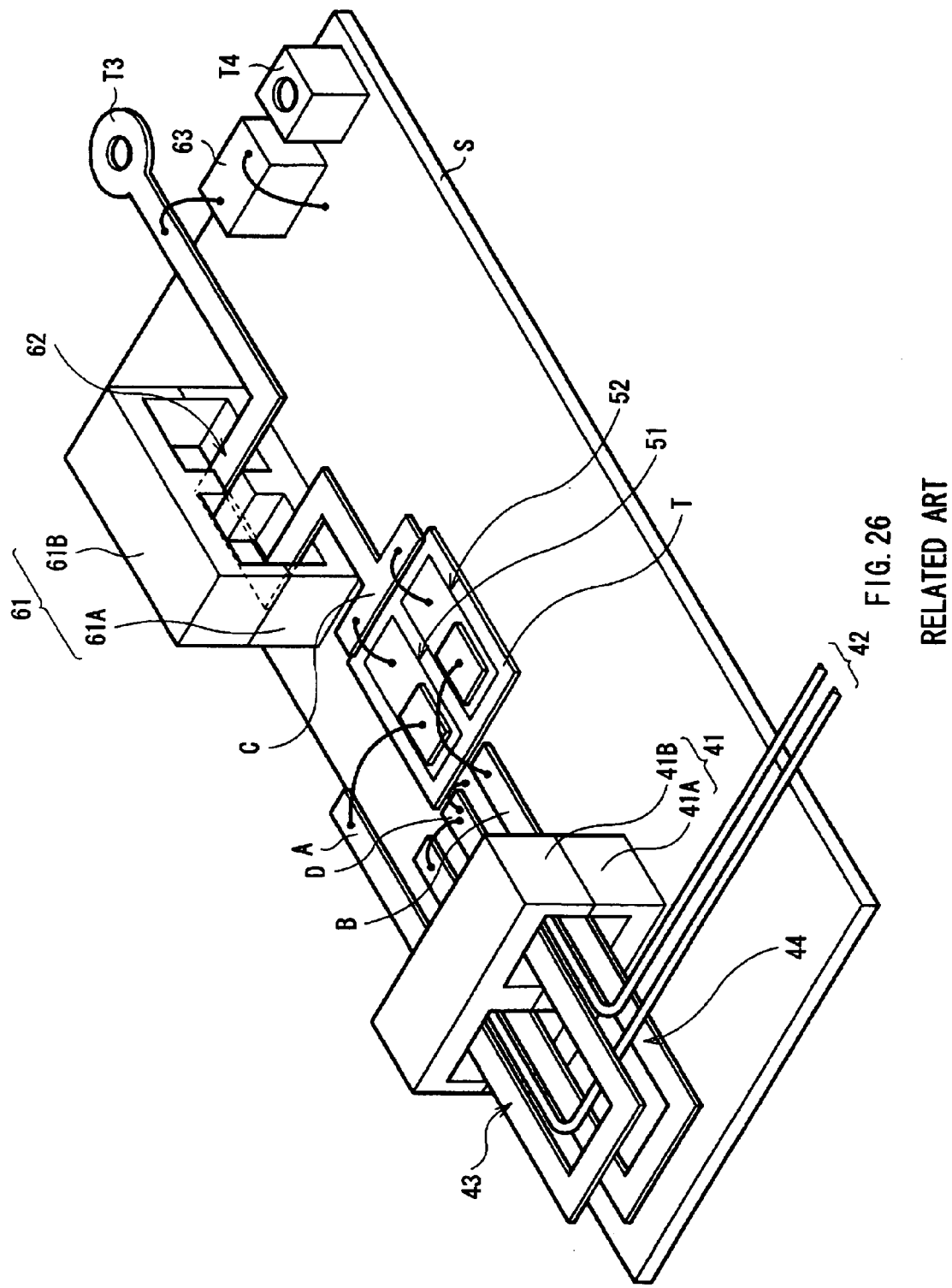
FIG. 26 shows a configuration of the switching power supply unit shown in FIG. 25.

In the comparative example, as shown in FIG. 26, the secondary windings (the secondary windings 43 and 44) of the transformer 4 and wiring of the smoothing circuit 106 are divided by the diodes 51 and 52 of the rectifier circuit 105. That is, the secondary winding of the transformer 4 and the wiring of the smoothing circuit 106 are formed of a separate wiring, respectively, thereby large number of parts is used for wiring and the structure is intricate. In addition, in order to electrically connect the wiring divided in this way, electrical connection by means of screw fastening, solder or welding, etc. is necessary between the wirings which are respectively extended from the diodes 51 and 52, the secondary windings 43 and 44, the choke coil 62 and the output terminal T3, the smoothing capacitor 63, and the substrate each other.

On the other hand, according to the third embodiment, as shown in FIG. 24, a path from the end portion B of the secondary winding 43 to the output terminal T3 via the center tap C is formed of a wiring member 27 (a first wiring member) made of a single sheet metal. On the other hand, the secondary winding 44 is formed of a wiring member 28 (a second wiring member) made of a single sheet metal. The substrate S which is electrically connected to the ground is used as wiring of the ground line LG, and no other wiring is provided therein. Thereby, the output terminal T4 is formed as a pillar-shaped terminal that is electrically connected to the substrate S. With such configuration, the secondary windings (secondary windings 43 and 44) of the transformer 4 and the wiring of the smoothing circuit 6 are formed of two separate sheet metals (the wiring members 27 and 28), respectively. At this time, the diodes 51 and 52 of the rectifier circuit 5 are disposed in the vicinity of the end portions of the wiring members 27 and 28.

According to the third embodiment, as described above, since the secondary windings (the secondary windings 43 and 44) of the transformer 4 and the wiring of the smoothing circuit 6 are formed of two sheet metals (the wiring members 27 and 28), the number of parts for wiring can be reduced from four parts to two parts. As a result, the structure can be simplified compared with configurations in the past.

Thereby, according to the third embodiment, since what is necessary is just to electrically connect the diode 51 and 52, the wiring members 27 and 28, the smoothing capacitor 63 and the substrate S by means of screw fastening, solder or welding, etc., the man-hour requirement for the foregoing operations can be reduced. In addition, since the number of junction points of wiring is decreased, generation of heat and power loss caused by the contact resistance in the junction point of wiring can be reduced. Moreover, since occurrence possibility of loosened screw thread or solder crack etc. is decreased, reliability can be raised.

Modification of Third Embodiment

Figure 27:
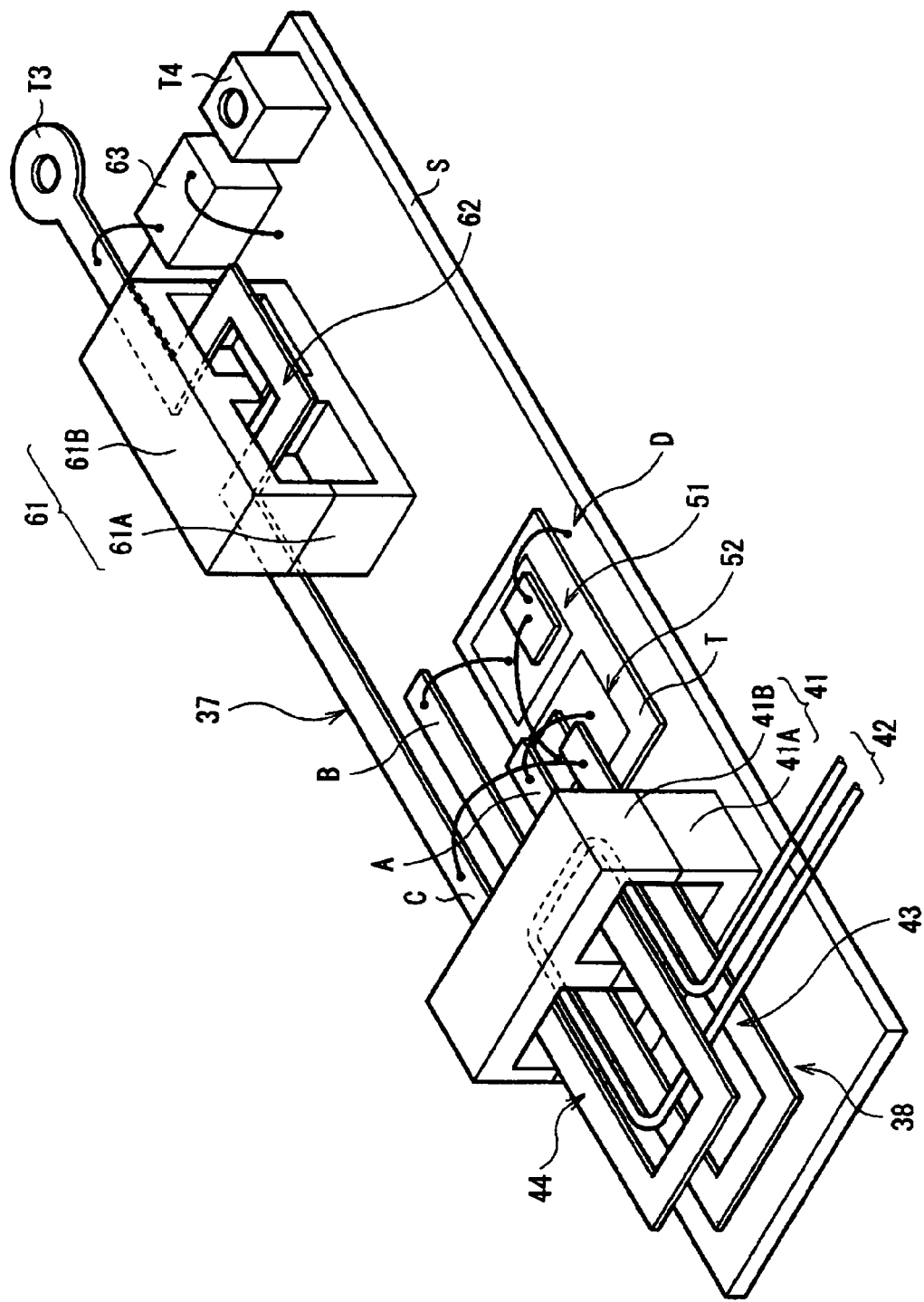
FIG. 27 shows a configuration of a switching power supply unit according to another modification.

According to the third embodiment, the path from the end portion B of the secondary winding 43 to the output terminal T3 via the center tap C is formed of the wiring member 27 (the first wiring member) made of a single sheet metal while the secondary winding 44 is formed of the wiring member 28 (the second wiring member) made of a single sheet metal. However, as shown in FIG. 27, a path from the end portion A of the secondary winding 44 to the output terminal T3 via the center tap C may be formed of a wiring member 37 (a first wiring member) made of a single sheet metal while the secondary winding 43 may be formed of a wiring member 38 (a second wiring member) made of a single sheet metal.

As mentioned above, the present invention has been described with reference to the embodiments, but the present invention is not limited to the above-mentioned embodiments and many other modifications are obtainable.

Figure 28:
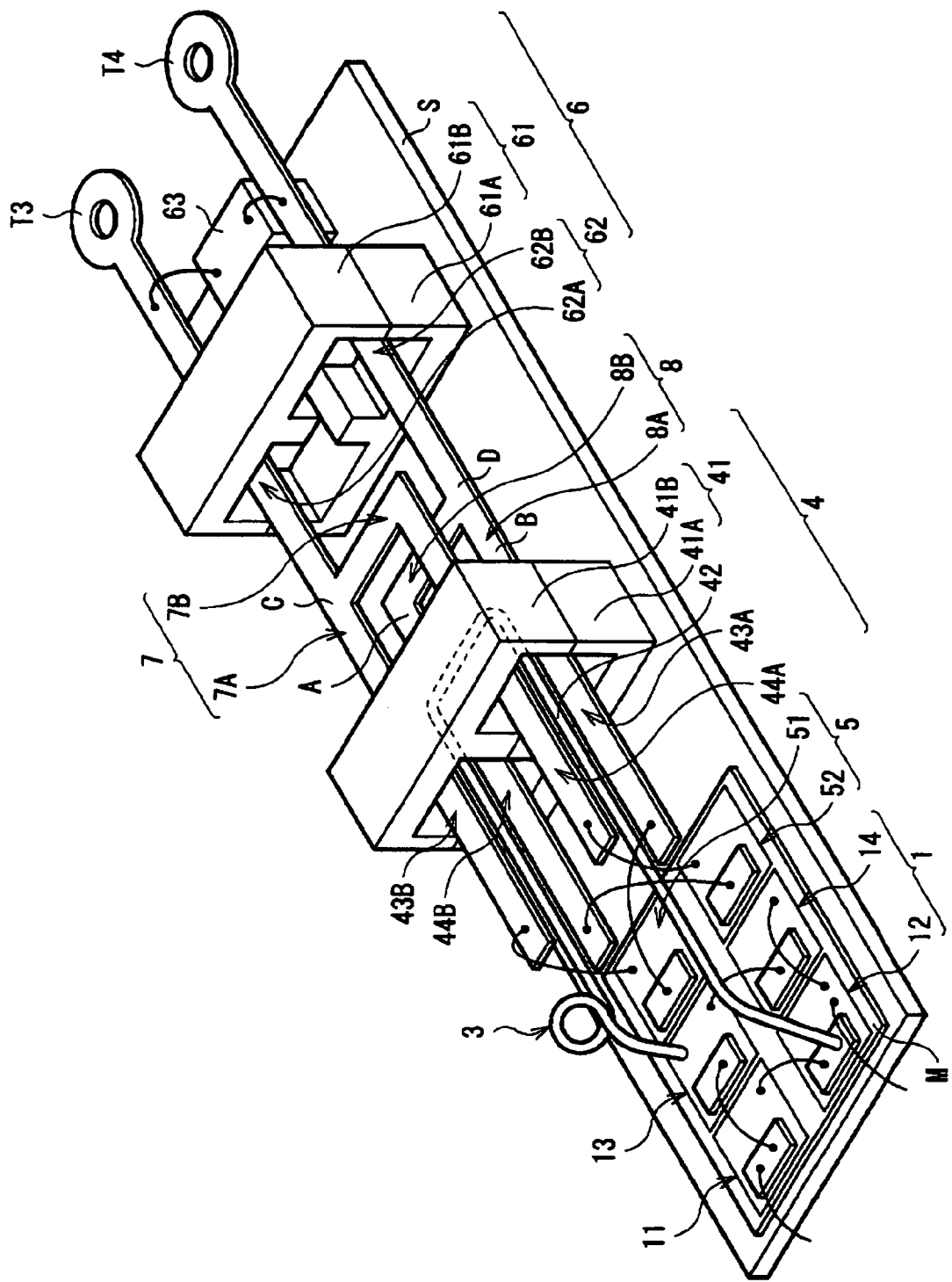
FIG. 28 shows a configuration of a switching power supply unit according to still another modification.

For example, in the foregoing embodiments, only the rectifier circuit 5 provided on the secondary side of the transformer 4 is mounted on the surface of the substrate S with an intermediate base T in between in a manner of bare chip mounting. However, as shown in FIG. 28, an inverter circuit 1 and a rectifier circuit 5 may be mounted on an intermediate base M to form an integral module, and then the integral module may be mounted on the substrate S by means of bare chip mounting. In this manner, a switching power supply unit can be manufactured simply.

It is to be noted that the intermediate base M is made of an insulating material, such as a ceramic, a plastic, or a film. Or, an insulating layer may be provided on the surface of the substrate S instead of the intermediate base M so that bare chip mounting can be carried out via the insulating layer. In this manner of mounting the rectifier circuit 5 on the substrate S with an intermediate base M in between in a manner of bare chip mounting, heat generated in the rectifier circuit 5 can be efficiently transmitted to the substrate S so that heat dissipation characteristics can be improved more. In particular, in a case where the intermediate base M is made of an insulating film or when an insulating layer is provided on the surface of the substrate S instead of the intermediate base M, higher thermal conductivity to the substrate S is obtainable, and heat dissipation can be more improved.

Figure 29A:
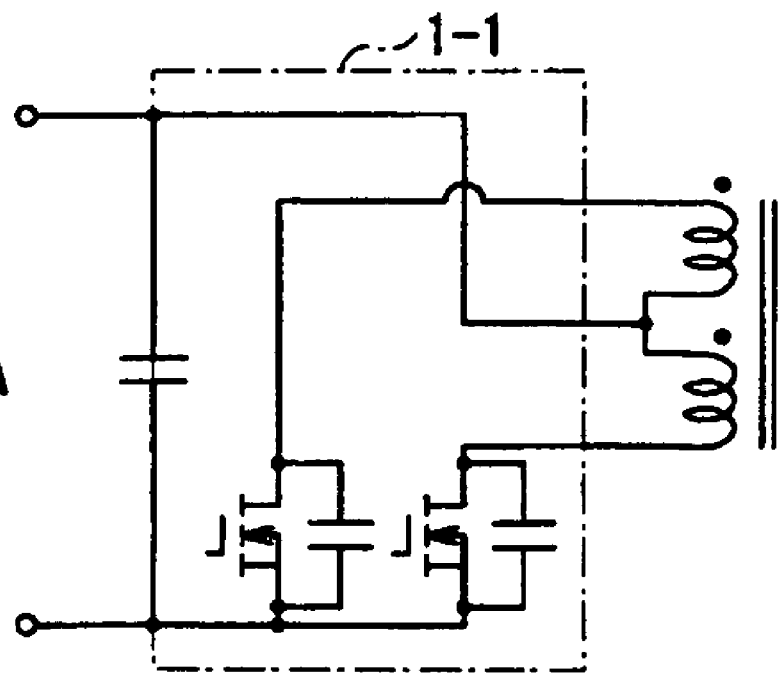
FIGS. 29A and 29B are circuit diagrams about various modifications of an inverter circuit.
Figure 29B:
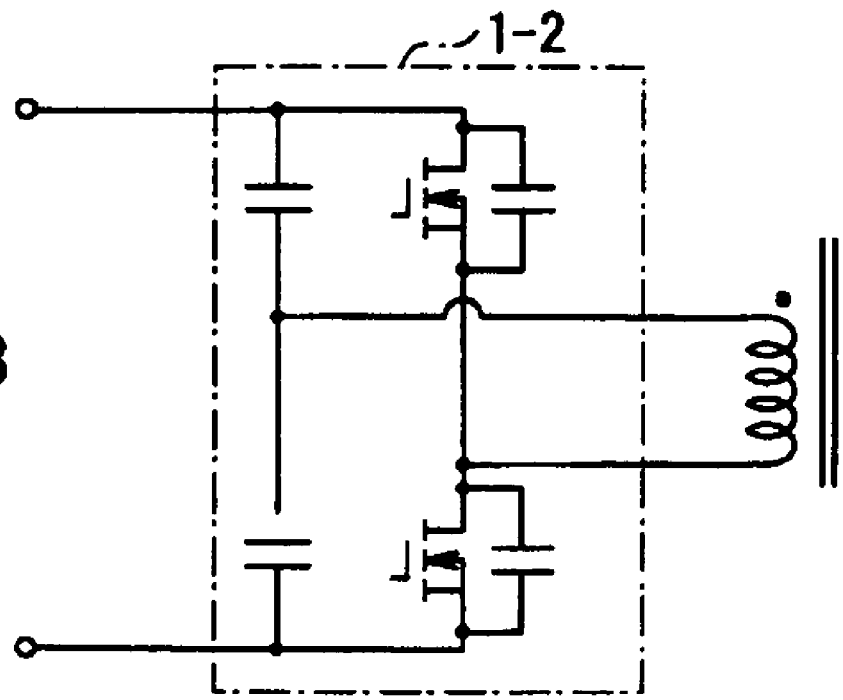

In addition, in the switching power supply unit of the above-mentioned embodiments, although the inverter circuit 1 is of a full-bridge type, it may be of a push pull type 1-1, of a half-bridge type 1-2 and the like as illustrated in FIGS. 29A and 29B.

It should be understood by those skilled in the art that various modifications, combinations, sub-combinations and alternations may occur depending on design requirements and other factors insofar as they are within the scope of the appended claims or the equivalents thereof.

What is claimed is:

1. A switching power supply unit comprising:
a switching circuit converting a DC input voltage into an AC voltage;
a transformer including a primary winding connected to the switching circuit, a first secondary winding, a second secondary winding, a third secondary winding, and a fourth secondary winding;
a rectifier circuit including a first rectifier device, a second rectifier device, a first junction point and a second junction point, and outputting a rectifier voltage from the first junction point and the second junction point, the first rectifier device being inserted between the first secondary winding and the second secondary winding to form a series circuit therewith, the first junction point connecting the second secondary winding and the third secondary winding, the second junction point being commonly connected to a first end portion which is one end of the fourth secondary winding on a side opposite to the second rectifier device, and a second end portion which is one end of the first secondary winding on a side opposite to the first rectifier; and
a smoothing circuit including a first input end, a second input end, a first output end and a second output end, the first input end being connected to the first junction point, the second input end being connected to the second junction point, the first output end and the second output end being each provided corresponding to the first input end and the second input end, respectively, and the smoothing circuit smoothing a rectifier voltage being input into the first input end and the second input end so as to output the rectifier voltage to the first output end and the second output end.

2. A switching power supply unit according to claim 1, wherein a first wiring member in a shape of plate constitutes a first path and a second path, the first path being from an end portion of the second secondary winding on a side of the first rectifier device to the first output end via the first junction point and via the first input end, the second path being from an end portion of the third secondary winding on a side of the second rectifier device to the first output end via the first junction point and via the first input end, and a second wiring member in a shape of plate constitutes a third path and a fourth path, the third path being from an end portion of the first secondary winding on a side of the first rectifier device to the second output end via the second end portion and via the second input end, the fourth path being from an end portion of the fourth secondary winding on a side of the second rectifier device to the second output end via the first end portion and via the second input end to the second output end.

3. A switching power supply unit according to claim 2, wherein the smoothing circuit includes a first inductor which is inserted and connected between the first input end and the first output end, a second inductor which is inserted and connected between the second input end and the second output end, and a capacitor which is inserted and connected between the first output end and the second output end, and the first wiring member includes the first inductor, while the second wiring member includes the second inductor.

4. A switching power supply unit according to claim 3, wherein each of the first inductor and the second inductor is of a single turn.

5. A switching power supply unit according to claim 1, wherein the transformer and the smoothing circuit are disposed adjacent to each other.

6. A switching power supply unit according to claim 1, wherein the rectifier circuit, the transformer, and the smoothing circuit are arranged in a line in this order.

7. A Switching power supply unit comprising:
a switching circuit converting a DC input voltage into an AC voltage;
a transformer including a primary winding connected to the switching circuit, a first secondary winding and a second secondary winding;
a rectifier circuit including a first rectifier device, a second rectifier device, and a first junction point, and outputting a rectifier voltage from the first junction point and the first end portion, the first rectifier device being inserted between the first secondary winding and the second secondary winding, one end of the second rectifier device being connected to a first end portion which is an end portion of the second secondary winding on a side opposite to the first rectifier, the other end of the second rectifier device being connected to a second end portion which is an end portion of the first secondary winding on a side opposite to the first rectifier, the first junction point connecting the first secondary winding and the first rectifier device; and
a smoothing circuit including a first input end, a second input end, a first output end and a second output end, the first input end being connected to the first junction point, the second input end being connected to the first end portion, the first output end and the second output end being each provided corresponding to the first input end and the second input end, respectively, and the smoothing circuit smoothing a rectifier voltage being input into the first input end and the second input end so as to output the rectifier voltage to the first output end and the second output end.

8. A switching power supply unit according to claim 7, wherein a first wiring member in a shape of plate constitutes a path from the second end portion to the first output end via the first junction point and via the first input end, and a second wiring member in a shape of plate constitutes a path from an end portion of the second secondary winding on a side of the first rectifier to the second output end via the first end portion and via the second input end.

9. A switching power supply unit according to claim 8, wherein the smoothing circuit includes a first inductor which is inserted and connected between the first input end and the first output end, a second inductor which is inserted and connected between the second input end and the second output end, and a capacitor which is inserted and connected between the first output end and the second output end, and the first wiring member includes the first inductor, while the second wiring member includes the second inductor.

10. A switching power supply unit according to claim 9, wherein each of the first inductor and the second inductor is of a single turn.

11. A switching power supply unit comprising:
a switching circuit for converting a DC input voltage into an AC voltage;
a transformer including a primary winding connected to the switching circuit, and a first secondary winding and a second secondary winding connected to each other;
a rectifier circuit including a first rectifier device, a second rectifier device, and a first junction point, and outputting a rectifier voltage from the first junction point and the ground line, the first rectifier device being inserted between the ground line and a first end portion which is an end portion of the second secondary winding on a side opposite to the first secondary winding, the second rectifier device being inserted between the ground line and a second end portion which is an end portion of the first secondary winding on a side opposite to the second secondary winding, the first junction point connecting the first secondary winding and the second secondary winding; and
a smoothing circuit including a first input end, a second input end, a first output end and a second output end, the first input end being connected to the first junction point, the second input end being connected to the ground line, the first output end and a second output end being each provided corresponding to the first input end and the second input end, respectively, and the smoothing circuit smoothing a rectifier voltage being input into the first input end and the second input end so as to output the rectifier voltage to the first output end and the second output end.

12. A switching power supply unit according to claim 11, wherein a first wiring member in a shape of plate constitutes a path from the second end portion to the first output end via the first junction point and via the first input end, and a second wiring member in a shape of plate constitutes the second secondary winding.

13. The switching power supply unit according to claim 12, wherein the smoothing circuit includes an inductor which is inserted and connected between the first input end and the first output end, and a capacitor which is inserted and connected between the first output end and the second output end, and the first wiring member includes the inductor.

14. A switching power supply unit according to claim 11, wherein a first wiring member in a shape of plate constitutes an path from the first end portion to the first output end via the first junction point and via the first input end, and a second wiring member in a shape of plate constitutes the first secondary winding.

15. The switching power supply unit according to claim 14, wherein the smoothing circuit includes an inductor which is inserted and connected between the first input end and the first output end, and a capacitor which is inserted and connected between the first output end and the second output end, and the first wiring member includes the inductor.

* * * * *